United States Patent [19]

Aridas et al.

[11] Patent Number: 5,757,895
[45] Date of Patent: *May 26, 1998

[54] EXTRACTING AND PROCESSING DATA DERIVED FROM A COMMON CHANNEL SIGNALLING NETWORK

[75] Inventors: James Aridas; Judith L. Culpepper; Kathleen Giessuebel, all of Virginia Beach; Yi Lin; Michael H. Penrod, both of Chesapeake, all of Va.; Dennis A. Perkinson, Westchester, Pa.; Nancy L. Sweet, Virginia Beach, Va.; Linda Trout-Jordan, Norfolk, Va.; Gerald J. Wardzinski; Karen Wolff, both of Virginia Beach, Va.

[73] Assignee: Unisys Corporation, Blue Bell, Pa.

[*] Notice: The term of this patent shall not extend beyond the expiration date of Pat. No. 5,579,371.

[21] Appl. No.: 555,551

[22] Filed: Nov. 9, 1995

[51] Int. Cl.[6] .................................................. H04M 15/00
[52] U.S. Cl. ........................ 379/136; 379/34; 379/112; 379/230
[58] Field of Search .................... 379/1, 9–10, 15, 379/34, 207, 229, 221, 230, 204, 136, 112

[56] References Cited

U.S. PATENT DOCUMENTS

| 5,008,929 | 4/1991 | Olsen et al. ............................ 379/115 |
|---|---|---|
| 5,218,632 | 6/1993 | Cool ........................................ 379/119 |
| 5,434,998 | 7/1995 | Akai et al. .............................. 395/575 |
| 5,488,648 | 1/1996 | Womble .................................... 379/34 |
| 5,533,116 | 7/1996 | Vesterinen ............................... 379/207 |
| 5,535,411 | 7/1996 | Speed et al. ............................ 395/800 |
| 5,550,914 | 8/1996 | Clarke et al. ........................... 379/230 |
| 5,579,371 | 11/1996 | Aridas et al. ........................... 379/230 |

*Primary Examiner*—Curtis A. Kuntz
*Assistant Examiner*—Duc Nguyen
*Attorney, Agent, or Firm*—Albert B. Cooper; Mark T. Starr

[57] ABSTRACT

A platform for connecting to a CCS7 network for supporting concurrently running CCS related applications. Copies of the SUs flowing through the network are sent to the platform where the FISUs, LSSUs and MSUs are filtered to provide the desired SU type for each of the applications. The MSUs are filtered by MSU category and MSU type within category into groups of MSUs of particular interest to the applications, respectively. Linked lists of filter elements associated with the respective linksets of the CCS7 network perform the filtering by comparing category and type fields to the MSU categories and types to form the groups. Filter change data received at a user interface is utilized to modify the filters.

13 Claims, 22 Drawing Sheets

LINK FILTER ARRAY ELEMENT

| TYPE | FIELD | SIZE | DESCRIPTION |
|---|---|---|---|
| LINKSET FILTER | FIRST | 4 | POINTER TO FIRST LINKSET-FILTER ELEMENT 112 |

FIG. 19a

LINKSET FILTER ELEMENT

| TYPE | FIELD | SIZE | DESCRIPTION |
|---|---|---|---|
| INTEGER | SLS INDEX | 2 | SLS INDEX NUMBER (IN SYSTEM) |
| FILTER ELEMENT | FIRST | 4 | POINTER TO FIRST FILTER ELEMENT 111 |

FIG. 19b

FILTER ELEMENT

| TYPE | FIELD | SIZE | DESCRIPTION |
|---|---|---|---|
| CHAR | APP | 10 | 8 CHARACTER APPLICATION ID |
| CHAR | CAT | 1 | MESSAGE CATEGORY CODE |
| CHAR | MSGTYPES | 32 | BIT MAP OF MSG TYPES 0 = OFF 1 = ON |
| FILTER ELEMENT | NEXT | 4 | POINTER TO NEXT FILTER ELEMENT 111 |

FIG. 19c

APPLICATION MESSAGE

| TYPE | FIELD | SIZE | DESCRIPTION |
|---|---|---|---|
| BUFDAT | HEADER | 16 | HEADER FOR MESSAGE |
| CHAR | MSG CAT | 1 | MESSAGE CATEGORY |
| CHAR | MSG TYPE | 1 | MESSAGE TYPE |
| INTEGER | NUM OCTETS | 2 | NUMBER OF OCTETS |
| INTEGER | SLS INDEX | 2 | SIGNALING LINKSET INDEX |
| CHAR | DIRECTION | 1 | 1 = SENT  2 = RECEIVE |
| INTEGER | TIMESTAMP | 4 | TIMESTAMP OF MESSAGE |
| CHAR | DATA | 276 | SIO AND SIF OF SS7 MESSAGE |

CHANGE ELEMENT

| TYPE | FIELD | SIZE | DESCRIPTION |
|---|---|---|---|
| INTEGER | SLS INDEX | 2 | LINKSET INDEX NUMBER |
| CHAR | APP | 10 | 8 CHARACTER APPLICATION ID |
| CHAR | CAT | 1 | MESSAGE CATEGORY CODE |
| CHAR | MSGTYPES | 32 | BIT MAP OF MSG TYPES<br>0 = OFF  1 = ON |
| INTEGER | EFF TIME | 4 | NUMBER OF MILLISECONDS SINCE MIDNIGHT |
| CHAR | STATUS | 1 | 0 = PENDING<br>1 = ACTIVE |
| CHAR | ACTION | 1 | 0 = NO ACTION PENDING<br>1 = TO BE ADDED<br>2 = TO BE CHANGED<br>3 = TO BE DELETED |
| FILTER ELEMENT | NEXT | 4 | POINTER TO NEXT FILTER ELEMENT 141 |

FIG. 22

MASTER LINKSET ELEMENT

| TYPE | FIELD | SIZE | DESCRIPTION |
|---|---|---|---|
| APP ELEMENT | FIRST | 4 | POINTER TO FIRST APPLICATION ELEMENT 162 — 170 |

APP ELEMENT

| TYPE | FIELD | SIZE | DESCRIPTION |
|---|---|---|---|
| CHAR | APP | 10 | 8 CHARACTER APPLICATION ID — 171 |
| CHAR | APP STATUS | 1 | 0 = OFF  APPLICATION<br>1 = ON  STATUS — 172 |
| CHAR | ACTION | 1 | 0 = NO ACTION PENDING<br>1 = TURNING ON<br>2 = TURNING OFF — 173 |
| INTEGER | EFF TIME | 4 | NUMBER OF MILLISECONDS SINCE MIDNIGHT — 174 |
| FILTER ELEMENT | FIRST | 4 | POINTER TO FIRST FILTER ELEMENT 160 — 175 |
| APP ELEMENT | NEXT | 4 | POINTER TO NEXT APPLICATION ELEMENT 162 — 176 |

MASTER FILTER ELEMENT

| TYPE | FIELD | SIZE | DESCRIPTION |
|---|---|---|---|
| CHAR | CAT | 1 | MESSAGE CATEGORY CODE |
| CHAR | MSGTYPES | 32 | BIT MAP OF MSG TYPES<br>0 = OFF  1 = ON |
| INTEGER | EFF TIME | 4 | NUMBER OF MILLISECONDS<br>SINCE MIDNIGHT |
| CHAR | STATUS | 1 | 0 = PENDING<br>1 = ACTIVE |
| CHAR | ACTION | 1 | 0 = NO ACTION PENDING<br>1 = TO BE ADDED<br>2 = TO BE CHANGED<br>3 = TO BE DELETED |
| FILTER ELEMENT | NEXT | 4 | POINTER TO NEXT FILTER ELEMENT 160 |

FIG. 24c

SERVER LINKSET ELEMENT

| TYPE | FIELD | SIZE | DESCRIPTION |
|---|---|---|---|
| FILTER ELEMENT | FIRST | 4 | POINTER TO FIRST FILTER ELEMENT 190 — 200 |

SERVER FILTER ELEMENT

| TYPE | FIELD | SIZE | DESCRIPTION |
|---|---|---|---|
| CHAR | APP | 10 | 8 CHARACTER APPLICATION ID — 201 |
| CHAR | CAT | 1 | MESSAGE CATEGORY CODE — 202 |
| CHAR | MSGTYPES | 32 | BIT MAP OF MSG TYPES 0 = OFF 1 = ON — 203 |
| FILTER ELEMENT | NEXT | 4 | POINTER TO NEXT FILTER ELEMENT 190 — 204 |

EXTRACTING AND PROCESSING DATA DERIVED FROM A COMMON CHANNEL SIGNALLING NETWORK

BACKGROUND OF INVENTION

The present invention generally relates to improved means and methods for extracting signaling information from a telephone network and for processing selected data therefrom.

This application claims the benefit of the commonly owned earlier filed U.S. patent applications, Ser. Nos. 08/344,316, 08/367,965 and 08/367,497.

More particularly, the present invention is directed to capturing and extracting message signals from a common channel signaling (CCS) network in essentially real-time using highly reliable, high capacity computer processing techniques which permit an extremely large volume of messages to be processed over long periods of time with minimum downtime for a wide variety of purposes, such as: network monitoring and surveillance, traffic and protocol analysis, market research, network testing, trouble shooting, performance and quality analysis, billing revenue enhancement, fraud detection and prevention, etc.

As is well known in the art, common channel signaling (CCS) is a method by which signaling and related instructions are transmitted over paths which are independent from the voice paths in the telephone network. More specifically, CCS is an out-of-band arrangement that employs a separate high-speed signaling network to carry signaling and supervisory information using a time-division multiplex format employing packet switched technology. CCS uses two discreet networks. One network is for normal speech or message transmission, and the other network is for transmitting signalling and related supervisory instructions between network elements.

Two well known CCS systems are currently in use for telephone signalling systems. The earlier system, introduced by AT&T in 1976, is referred to as CCSS6 which was provided to improve call management and to support a variety of enhance telephone services. While CCSS6 offered a significant improvement over previous telephone networks, it was found to be inadequate when applied to a digital environment. This led to the development of a new CCS network known as CCSS7, which has become the primary system used by the Bell Operating Companies, and is specifically designed for use in high-speed digital networks, while also being capable of accommodating low-speed facilities as well.

Two types of signaling messages are conveyed via CCSS7: circuit-related messages and database access messages. Circuit-related messages are used to establish and disconnect calls between two service switching and signaling points. Database access messages are used to retrieve information stored in databases provided in the CCSS7 network.

Because supervisory instructions in CCSS7 are coded as actual textual messages instead of some sequence of multi frequency tones, and because a much higher bandwidth is available for signaling, more detailed information about a call (for example in terms of desired network treatment, call origin, etc.) can be transacted across the network. In turn, this opens the door to providing new and more sophisticated services.

However, while CCSS7 offers significant operational improvements and is capable of providing a wide range of services not previously available, it also greatly increases network management and control problems, particularly since different portions of the network may be owned or leased by different companies, and also different companies (and/or third-party providers) may provide different services. Particularly serious problems have been presented in extracting data from the very high volume of the signals flowing over the SS7 network, and then selectively processing the extracted data in real time and with high reliability as required for a wide variety of purposes, particularly those emanating from the new and more sophisticated services made possible by an SS7 network.

While various techniques are known in the art for capturing SS7 signals, extracting information therefrom, and processing the extracted information, this capability has been inadequate. Because of the difficulties involved in handling the enormous number of telephone messages that continuously flow over an SS7 network, which makes extraction and processing of these large numbers of SS7 signals a most formidable problem, particularly where substantially real time operation and very high reliability are required.

SUMMARY AND OBJECTS OF THE INVENTION

A broad object of the present invention is to provide improved means and methods for capturing, extracting and processing information from a CCS network.

A more specific object of the present invention is to provide a high capacity data processing system for continuously extracting and processing a very high volume of CSS network signals in substantially real-time with high reliability.

Another object of the present invention is to provide a high capacity data processing system, in accordance with one or more of the foregoing objects, having the additional capacity of simultaneously processing extracted CSS data in essentially real-time for a plurality of different applications.

An additional object of the present invention, in accordance with one or more of the foregoing objects is to provide for varying the manner in which one or more simultaneously running applications responds to extracted CCS data.

A further object of the present invention is to provide a high capacity data processing system, in accordance with any one or more of the foregoing objects, which also provides for user-controllable selection of the particular CCS network paths and types of signals to be monitored, the particular parameters to be extracted from the selected CCS signals, and the nature of processing to be performed thereon.

An additional object of the present invention, in accordance with one or more of the foregoing objects, is to provide an information platform architecture which permits one or more different applications to be concurrently performed and/or modified by application software.

A still further object of the present invention, in accordance with any one or more of the foregoing objects, is to incorporate redundancy and fault tolerance into the data processing system in a manner such that very high reliability and minimum system downtime is achieved in a highly efficient manner.

The above objects are accomplished in a particular preferred embodiment of the invention wherein the system is designed as a distributed architecture data processing system arranged as a Common Channel Information Platform (CCS-IP) for selectively extracting and processing a very large volume of CCS network signals and parameters for a plurality of coexisting running applications with very high reliability.

In a preferred embodiment, the CCS-IP comprises a master data processing station at a regional location which communicates via a combination of LANs and WANs with a plurality of geographically dispersed data processing sites which receive SS7 network signals captured from an SS7 network via standard T1 transmission paths. Both the master data processing station and the data processing sites are provided with redundancy and fault tolerance features in a manner which provides a highly reliable system. In addition, an X-Window-based graphical user interface is provided at the master station for controlling the administration and management of the CCS-IP, as well as for selecting particular SS7 data which is to be extracted and processed by one or more coexisting applications.

The specific nature of the invention as well as other objects, uses, features and advantages thereof will become evident from the following description of a preferred embodiment in conjunction with the accompanying drawings.

BRIEF DESCRIPTION OF THE DRAWINGS

FIGS. 19a, 19b and 19c are diagrams of the data structures of elements utilized in the MSU filtering structure of FIG. 18. FIGS. 19a, 19b and 19c illustrate the link filter array element, linkset filter element and filter element, respectively.

FIG. 22 is a diagram of the data structure of the filter change element utilized in the filter change structure of FIG. 21.

FIGS. 24a, 24b and 24c are diagrams of the data structures of the elements of the master filter structure and elements of FIG. 23. FIGS. 24a, 24b and 24c illustrate the master linkset element, application element and master filter element, respectively.

FIGS. 26a and 26b are diagrams of the data structures of the elements of the server filter element, respectively.

DETAILED DESCRIPTION

Like numerals refer to like elements throughout the figures of the drawings.

Although this detailed description will be directed to use of the CCS-IP with an SS7 network, it is to be understood that the present invention is also applicable to other types of CSS networks.

Figure 1:
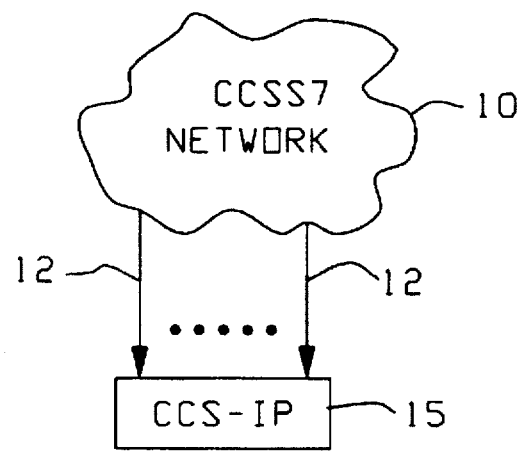
FIG. 1 is an overall view of the present invention applied to a CCSS7 Network.

Referring initially to FIG. 1, an overall view of the deployment of the present invention is illustrated. As shown in FIG. 1, SS7 signals 12 derived from an SS7 network 10 are applied to a Common Channel Signal Information Platform (CCS-IP) 15 provided in accordance with the present invention. These SS7 signals 12 contain information indicative of signal flow in the SS7 network 10 and may be provided in various ways known to those skilled in the art. The particular manner in which this is done will not be described herein, since it is outside the scope of the present invention. It is sufficient to note that these SS7 signals 12 are typically derived in a non-intrusive manner by capturing SS7 signals flowing in data links of the SS7 network 10 at one or more locations. These captured SS7 signals are then sent to CCS-IP 15 using standard T1 transmission lines. CCS-IP is a distributed architecture, data processing system designed to extract and process selected data from these applied SS7 signals 12.

Figure 2:
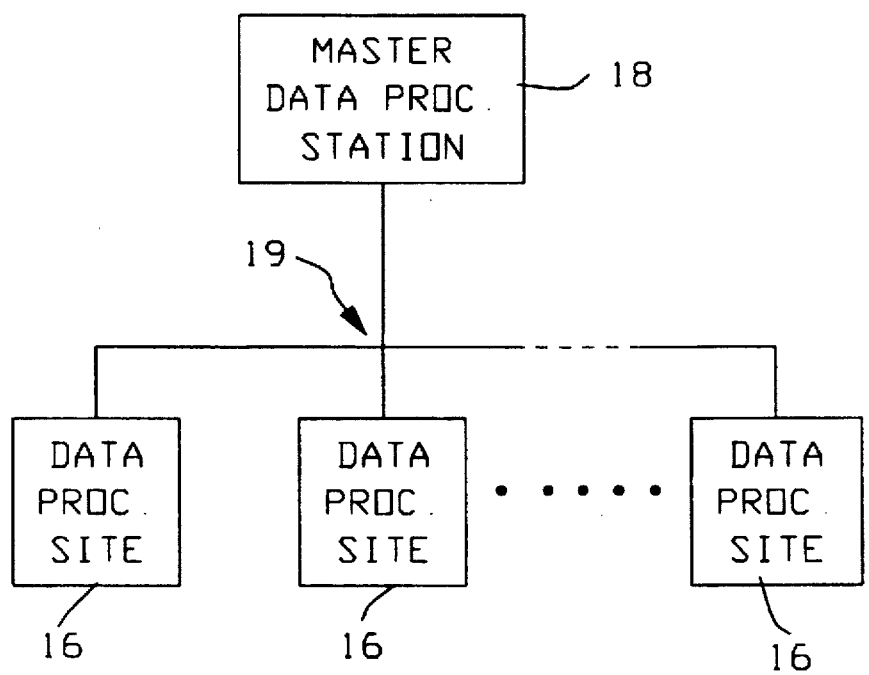
FIG. 2 generally illustrates a preferred embodiment of a CCS-IP in accordance with the invention.

FIG. 2 generally illustrates a preferred embodiment of CCS-IP 15 in accordance with the invention. As shown in FIG. 2, CCS-IP 15 includes a plurality of geographically dispersed Data Processing Sites 16 at which SS7 network signals 12 are received and processed. A Master Data Processing Station 18 at a regional location communicates with these Data Processing Sites 16 via a combination of local area networks (LANS) and wide area networks (WANs) 19. Master Data Processing Station 18 provides a centralized, single point of control for management and administration of the processing performed on the SS7 signals 12 received at the Data Servers 16.

Figure 3:
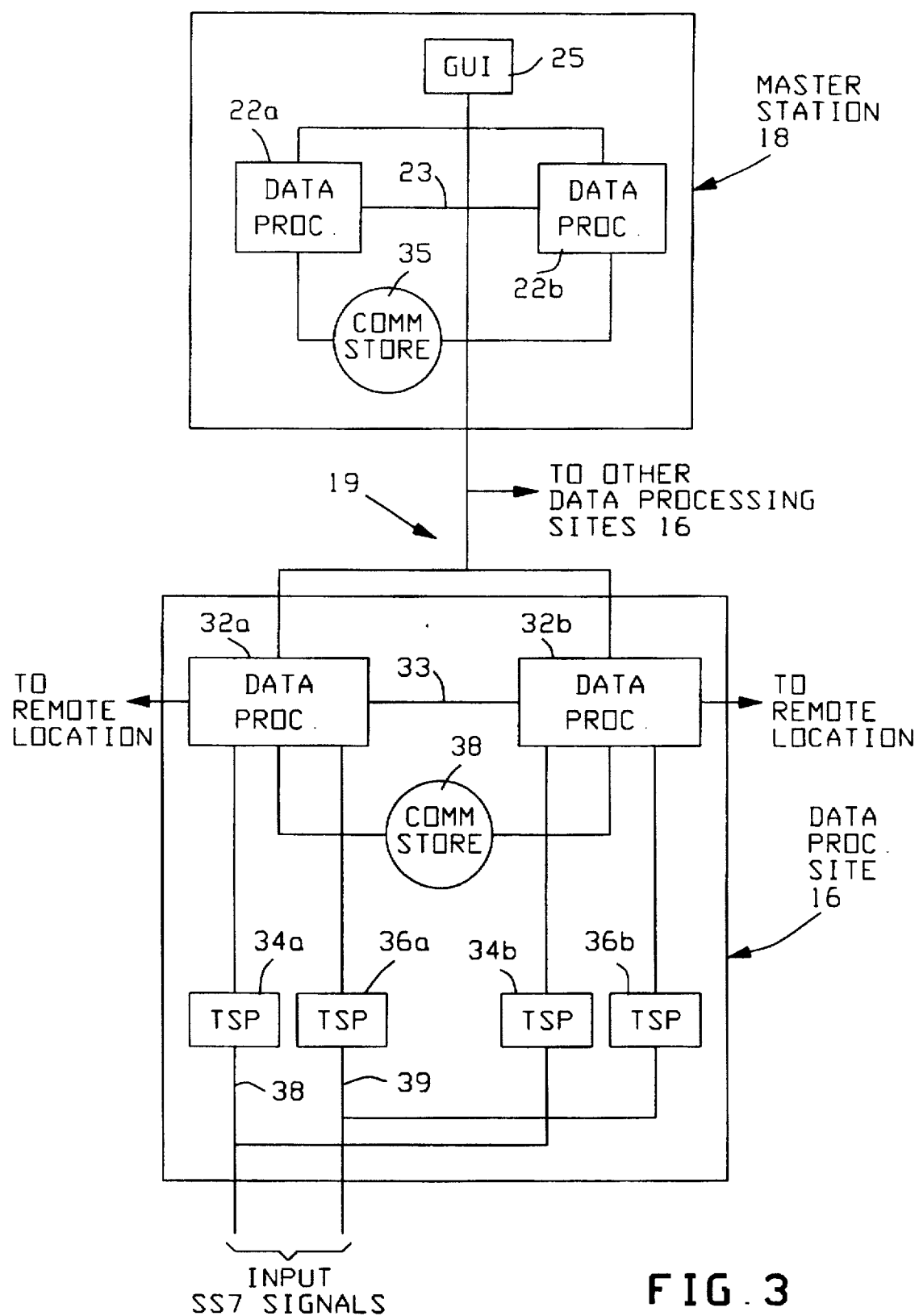
FIG. 3 illustrates preferred embodiments of a master station and data processing site shown in FIG. 2.

The generally shown CCS-IP embodiment of FIG. 2 is illustrated in more detail in FIG. 3. Although only a single Data Processing Site 16 is shown in FIG. 3, it will be understood that the other Data Processing Sites 16 may be implemented in a similar manner.

As shown in FIG. 3, both the Master Data Processing Station 18 and the illustrated Data Processing Site 16 include a mated pair of data processors (21a, 21b and 22a, 22b) coupled together and to common non-volatile mass storage 35 and 38, respectively, so as to provide for recovery in the event that the active data processor becomes inoperative.

The Data Processing Site 16 in FIG. 3 also includes a plurality of Telephony Service Platforms (TSPs) 34a, 34b and 36a, 36b which respectively interface Data Processor 32a and 32b to T1 lines 38 and 39 on which the input SS7 signals 12 are received. Both data processors 32a and 32b and their respective TSPs 34a, 36a, and 34b, 36b operate concurrently in response to the same SS7 signals, thereby providing a hot standby capability with one system shadowing or mirroring the other. During normal operation, one system is designated as the primary (e.g., data processor 32a and its respective TSPs 34a, 36a) and the other system is designated as a standby (e.g. data processor 32b and its respective TSPs 34b, 36b). If a failure occurs in the primary system, the standby system assumes the role of the primary system and continues processing. As shown in FIG. 3, both data processors 32a and 32b have assess to the common storage 38, which is used by the standby system to recover without loss of data. During normal operation, mass storage 35 is assigned only to the primary system, which continuously writes its processed results to mass storage 35 along with any other data required for recovery. If there is a failure in the primary system, mass storage 38 is automatically reassigned to the standby system. The standby system assumes the role of the primary by performing a recovery operation using the data in mass storage 38 and then reinitiates normal operation.

When the failed system is restored, both systems are resynchronized to the same data state. The failed system now becomes the standby system, while the system that assumed the role of primary retains that status.

It will be understood that a similar recovery operations are provided for data processors 22a and 22b at the Master Data Processing Station 18 in FIG. 3 using a like mass storage 35 to which each is connected.

For further reliability, the Master Station 18 and each Data Processing Site 16 provide a state-of-the-art uninterruptable power supply capability supported by their respective data processors. Upon detecting the loss of power at a Data Processing Site 16 or at a master station 18, the system will begin a graceful shutdown sequence, including storing critical data on non-volatile permanent storage, such as the mass storage 35 and 38.

As shown in FIG. 3, Master Station 18 also includes a graphical user interface (GUI) 25, which provides for control and management of the overall CSS-IP 15 (FIG. 1). GUI 25 communicates with the Master Station data processors 22a and 22b and also the data processors 32a and 32b at each Data Processing site 16 via LANs and WANs 19. GUI 25 typically includes a window-driven workstation, which permits an operator to enter control information and also provides for display of system status and alarms.

A more detailed description of CCS-IP 15 will next be provided with reference to FIGS. 4–13.

Master Data Processing Station 18 (FIGS. 2 and 3)

Master Station 18 is a centralized, single point of control and administration for the entire CCS-IP 15. In the preferred embodiment, data processors 22a and 22b are designed to operate under the industry standard UNIX System V, Release 4, and may be hosted, for example, on a commercially available Unisys U6000/500 computer. The U6000/500 is a high performance UNIX system, which uses Intel's Pentium Processors to provide high speed, high capacity multiprocessing.

Site Data Processors 32a and 32b (FIG. 3)

In the preferred embodiment data processors 32a and 32b at each data processing site 16 are likewise designed to operate under UNIX System V, Release 4, and each may likewise employ a commercially available Unisys U6000/500 computer.

TSPs 34a, 36a and 34b, 36b (FIG. 3)

In the preferred embodiment, the TSPs are each a high performance MultiBus II system operating under control of its respective Data Processor 32a or 34a. The major purpose of each TSP is to perform initial processing on the input SS7 signals 12 the resulting processed data then being forwarded to its respective data processor 32a or 32b.

Figure 4:
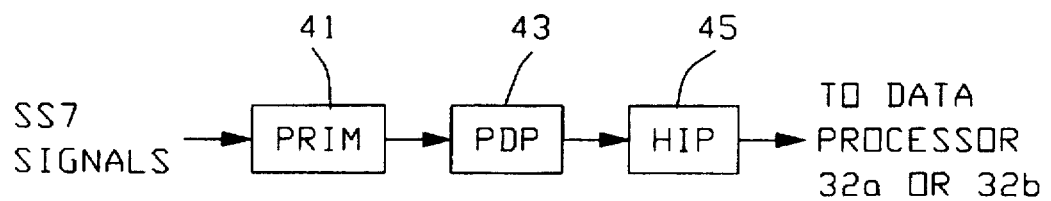
FIG. 4 illustrates a preferred embodiment of a TSP shown in FIG. 3.

As shown in the preferred embodiment of a TSP illustrated in FIG. 4, each TSP includes a Primary Rate Interface Module (PRIM) 41, a Packet Data Processor (PDP) 43, and a Host Interface Processor (HIP) 45. These TSP components are discussed below.

PRIM 41 (FIG. 4)

PRIM 41 is a high performance, MultiBus II card serving as a front-end processor to continuously scan SS7 signals 12 on the input II line, which may typically correspond to 12 signaling links in the SS7 network. PRIM 41 provides for screening and filtering the SS7 signals on the input T1 line in accordance with predetermined criteria selected by one or more running applications. The resulting screened and filtered output produced by PRIM 41 is passed to PDP 43.

PDP 43 (FIG. 4)

PDP 43 is a high performance MultiBus II processor card which aggregates the screened and filtered output received from PRIM 41, also based on predetermined criteria selected by one or more running applications. The resulting aggregated data produced by PDP 43 is passed to HIP 45.

HIP 45 (FIG. 4)

HIP 45 is a MultiBus compatible, single board processor, that provides a high-speed SCSI interface between the TSP and its respective data processor 34a or 34b. HIP 45 provides data buffering and can support bi-directional data exchange at full SCSI speeds. Aggregated data is passed from PDP 43 to the respective data processor 34a or 34b over this interface.

Figure 4A:
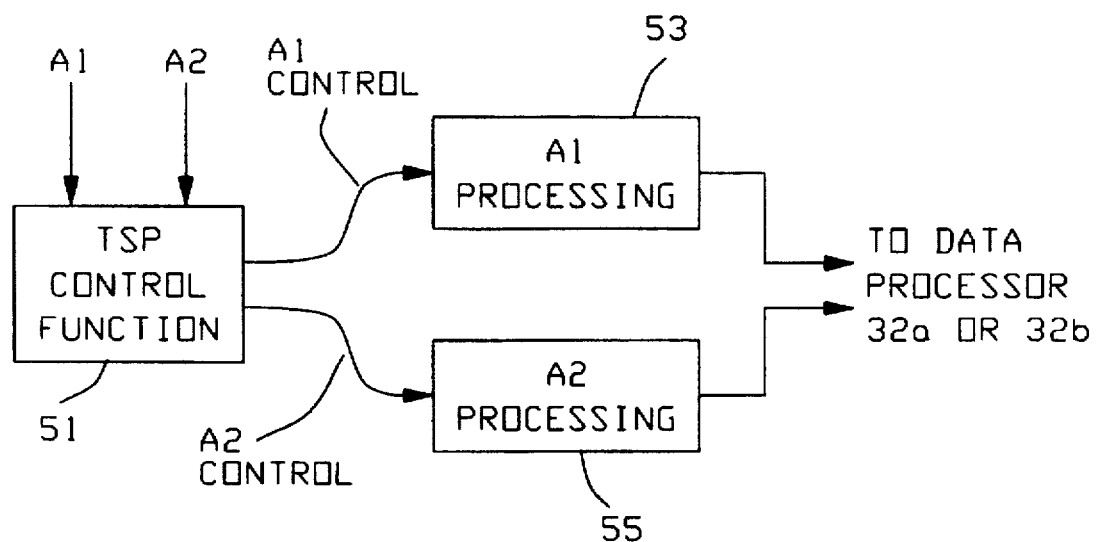
FIG. 4A schematically illustrates the operation of a TSP for a plurality of running applications.

FIG. 4A schematically illustrates the operation of a TSP for a plurality of running applications. Control functions 51 in FIG. 4A represents the screening, filtering, and generating control functions provided by ATSP for the running of applications, and includes software downloaded from these applications. The resulting "A1 control" and "A2 control" outputs from TSP control functions 51 in FIG. 4 represent the control dictated by two concurrently running applications A1 and A2 in response to their respective downloaded software. "A1 Processing" and "A2 Processing" blocks in FIG. 4 represent the processing performed on the input SS7 signals by the TSP in response to the respective A1 control and A2 control outputs, the resulting A1 and A2 processing being sent to the respective data processor 32a or 32b in FIG. 3.

Although the previous description has described each TSP as having only a single PRIM 41, PDP 43 and HIP 45, it is to be understood that a plurality of each may be provided where required to obtain the desired operating speed and/or to handle the number of applications which may be running at the same time.

The resulting data passed to each data processor 32a or 32b from their respective TSPs is processed by the application software provided therein, which may also be downloaded from the Master Station 18 (FIG. 3) for the particular applications to be run. It will be understood that the provision of such a downloading capability of application software for data processors 32a and 32b as well as for their respective TSPs makes CCS-IP 15 a highly versatile platform for processing input SS7 signals that can readily be adapted for a wide variety of purposes.

Figure 5:
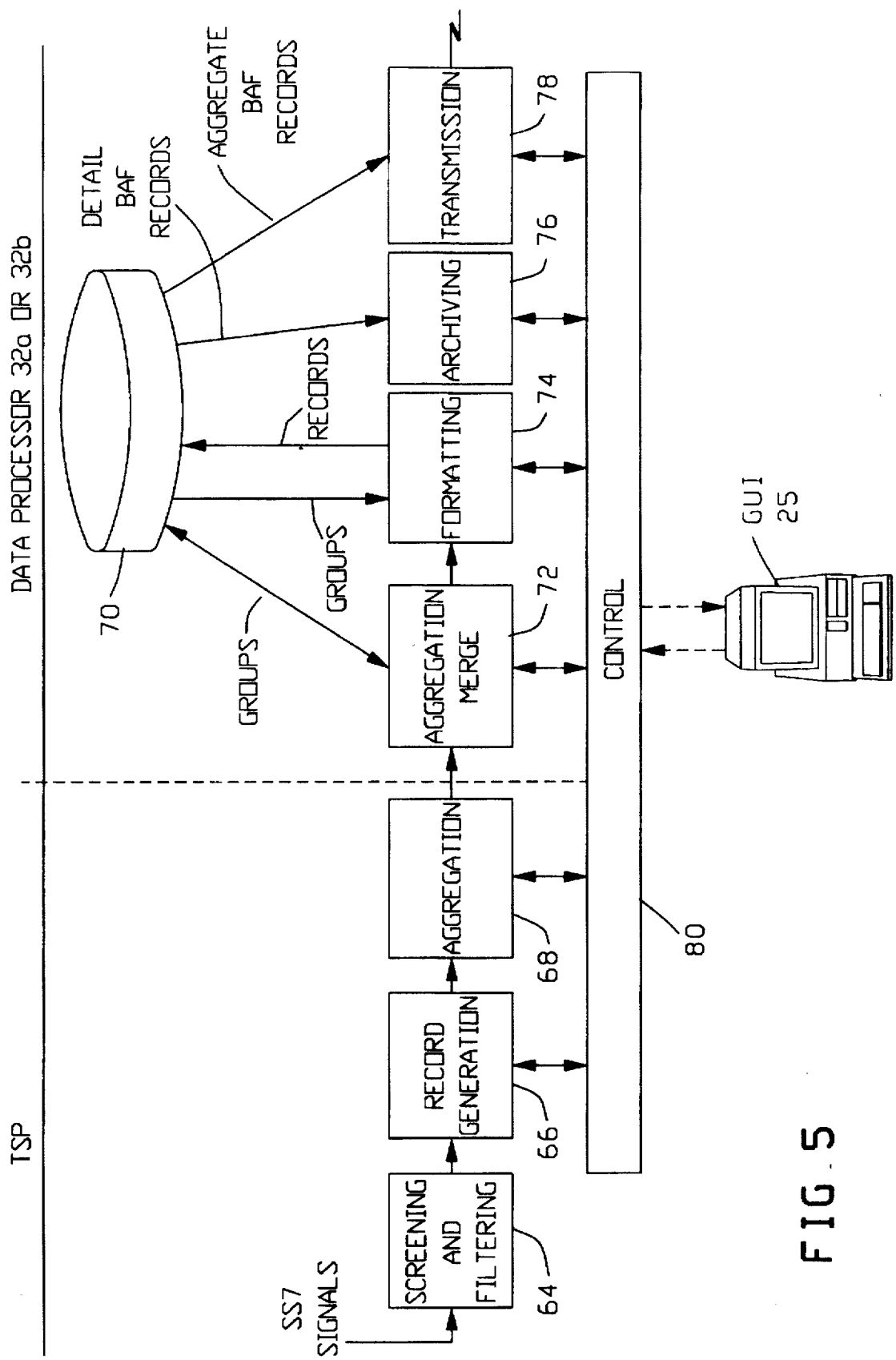
FIG. 5 is a functional block diagram of a usage measurement application which may be performed in accordance with the invention.

FIG. 5 is a functional block diagram of a usage measurement application showing the cooperative functional relationship between a TSP, its respective site data processor 32a or 32b, and a GUI 25 which will be assumed to be located at the Master Data Processing Station 18. It is to be understood that GUI 25 could also be distributed throughout the system. For example, a GUI capability may also be provided at one or more data processing sites 16, such that a portion of the management and control administrative functions provided by the graphical user interface 25 could also be provided at each site 16, or be communicated from or at some remote site other than the Master Station.

Still with reference to FIG. 5, the screening and filtering block 64, the record generation block 66 and the aggregation block 68 correspond to the previously described functions performed by a TSP in accordance with one or more running applications, whereby the TSP provides an aggregated output to its respective site data processor 32a or 32b.

FIG. 5 also illustrates the functions performed by the site data processor 32a or 32b in response to the aggregated output from its respective TSP. Component 70 in FIG. 5 represents the operational portion of the sited data processor which performs the functions indicated by aggregation merging block 72, record formatting block 74, whereby archiving block 76, and transmission block 78, in accordance with one or more running applications, particular formatted records are produced, archiving and transmitted to a remote location.

It will be understood with reference to FIG. 5 that the performance provided by the various functions shown therein is determined by the control function indicated by block 80, which is in turn under the control of the GUI 25. It will also be understood from the previous discussion in connection with FIG. 4 that the functions shown in FIG. 5 can be concurrently performed for a plurality of running applications.

Software Features

CCS-IP system software is structured so that executing application processes can communicate with other processes without explicit knowledge of the location of the recipient process. For this purpose CCS-IP software provides a system call that can be accessed to determine the physical location of the recipient, which is required to perform the necessary actions.

During CCS-IP startup and initialization, system configuration files are downloaded from the primary data processor 22a or 22b at the Master Station 18 to the site data processors 32a and 32b and their respective TSPs. These files contain information on the configuration of the SS7 network from which the SS7 signals 12 are derived whereby each site data processor and its respective TSPs can be properly configured for operation therewith. Also, during initialization, application software is downloaded so as to configure the data processors and TSPs at each site for each application which is to be run. In particular, files containing screening and filtering criteria selected by GUI 25 are downloaded from the Master Station 18 to the data processing sites so as to permit the TSPs thereat to determine the criteria for screening and filtering the input SS7 signals.

The system software also performs error processing for maintaining system operations by monitoring communications to determine failure of connections, processors, and equipment. Timeout values are established which, when exceeded, result in notification to the Master Station and respective site data processor for logging of the error, and, if necessary, to initiate automatic switching to backup operations.

The standard software available for use on the commercially available Unisys U6000/500 data processor along with supporting software packages are preferably used for providing the CCS-IP system software.

Error Recovery

CCS-IP error recovery relies on the mirroring of data between mated pairs of data processors, as previously described with respect to FIG. 3. If one data processor becomes inoperable, the mate will continue processing data, using the data when the mate is in the associated non-volatile mass data store 35 or 38.

Each member of a mated pair of data processors continuously performs "heartbeat" checks of its mate to determine if it is operating normally. If the standby data processor determines that the primary has failed, it will take over processing. The switch-over is automatic, with no operator required. When the CCS-IP is started up in one of the mated pairs, it will attempt to communicate with its mate. If communication is established, the databases of the two will be synchronized using the associated mass store 35. If communication cannot be established, it is assumed that the mate is not operating, and the just started data processor assumes primary responsibilities.

At a data processor site, the mated pair of data processors performs "heartbeat" processing in a manner similar to the that described above for the Master Station 18. If a failure is detected by one of the mated pair, the Master Station is notified and the remaining member automatically assumes processing responsibility.

When one site data processor of a mated pair is restarted, it attempts to communicate with its mate and also the Master Station 18. If communication is established, the databases on the restarted site data processor and its mate are synchronized using the associated mass store 38. Synchronization is also provided with the Master Station.

A failure on one of the boards of a primary TSP will cause the TSP to be automatically reset and reloaded, after notifying the Master Station 18 of the failure. During the time it takes to reload the TSP, all processing of the link set data will be performed by the mate U6000 and the corresponding TSP. Upon completion of the download of the TSP, which includes the synchronization of data, processing of the link set data will resume on the primary TSP. In the event a failure of the TSP requires a restart of the CCS, recovery procedures will be performed as if the site data processor had failed.

Graphical User Interface 25 GUI (FIGS. 3 and 5)

GUI 25 is implemented using an X-Window-based Motif, and allows an operator to control, monitor and manage the overall CCS-IP operation from the Master Station 18. Selections by an operator are made using the workstation keyboard or a mouse-like device.

Figure 6:
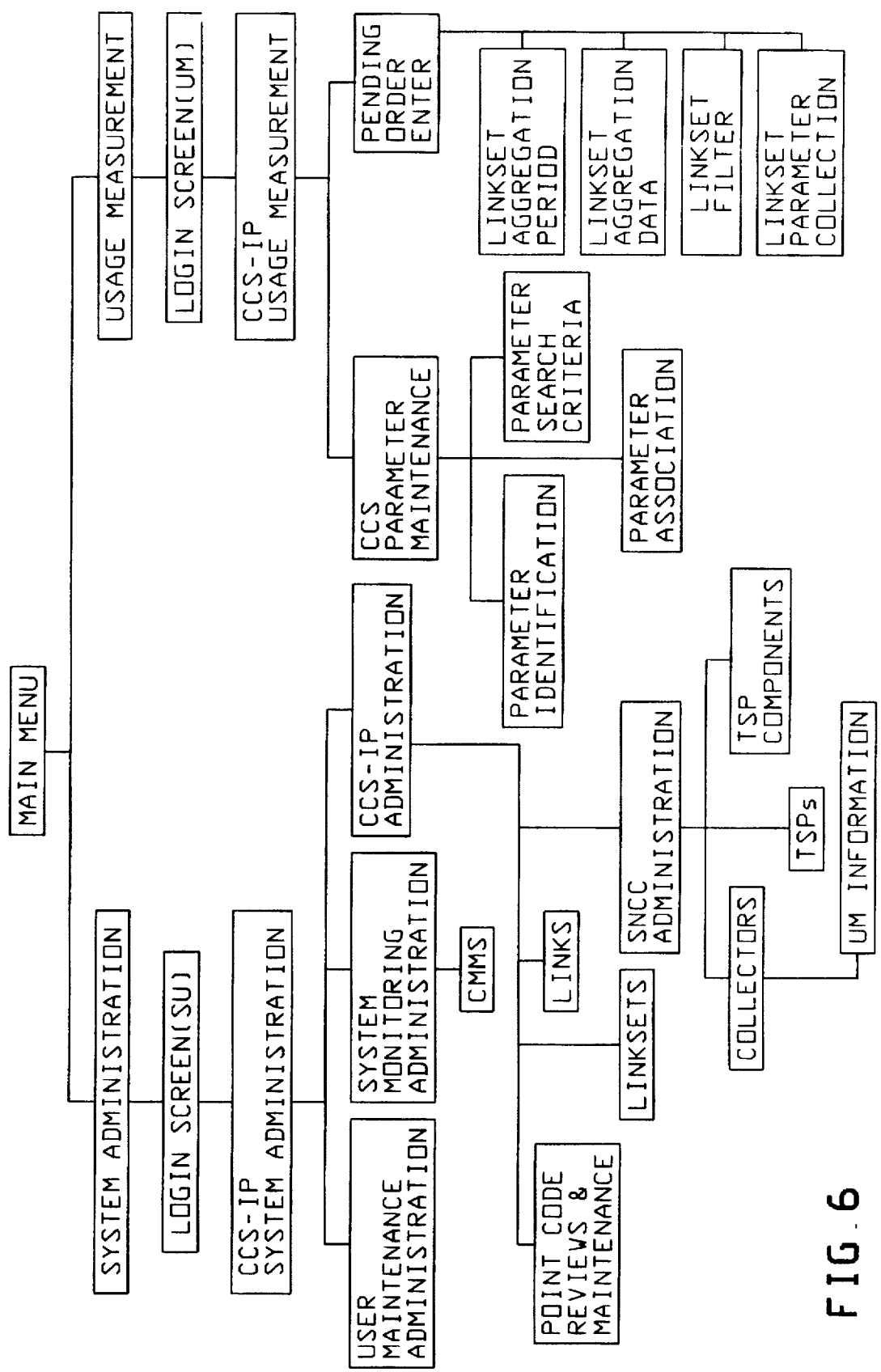
FIG. 6 illustrates an example of a hierarchical GUI window structure.

FIG. 6 illustrates an example of a hierarchical GUI window structure. The GUI is window driven, that is, the user is presented with a series of windows to perform various functions. As selections are made via button entries, additional windows are presented to allow the entry of data. The user is guided through a logical sequence of windows to perform each task. There is an implied hierarchy of the windows, such that some windows can only be accessed after logins and selections are made at a previous window. The following are some examples of GUI operation.

Figure 7:
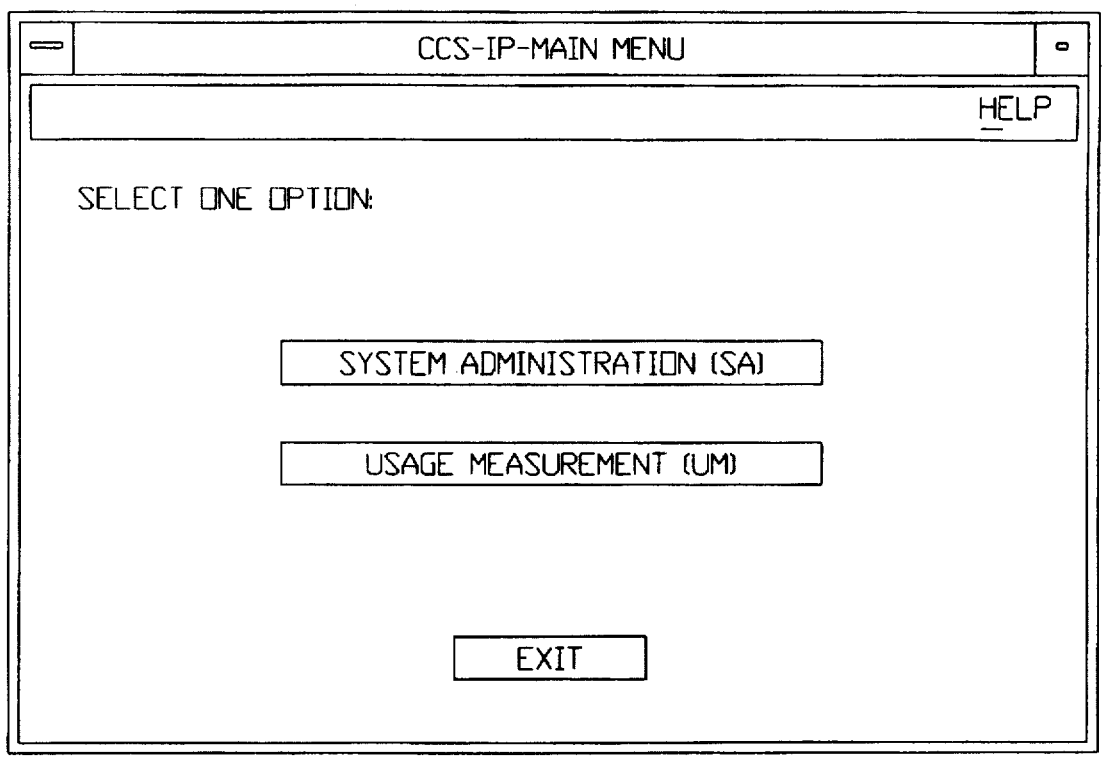
FIG. 7 illustrates a Main Menu window.

As shown in FIG. 6, the GUI begins at the Main Menu window, which is illustrated in FIG. 7. This Main Menu window is displayed when CCS-IP is initiated. The user can select either the System Administration (SA) or Usage Measurement (UM) application by pressing the appropriate pushbutton. The user can also press "EXIT" to exit the system. The system allows a user to have several applications active concurrently as long as the user has the proper authorization.

Figure 8:
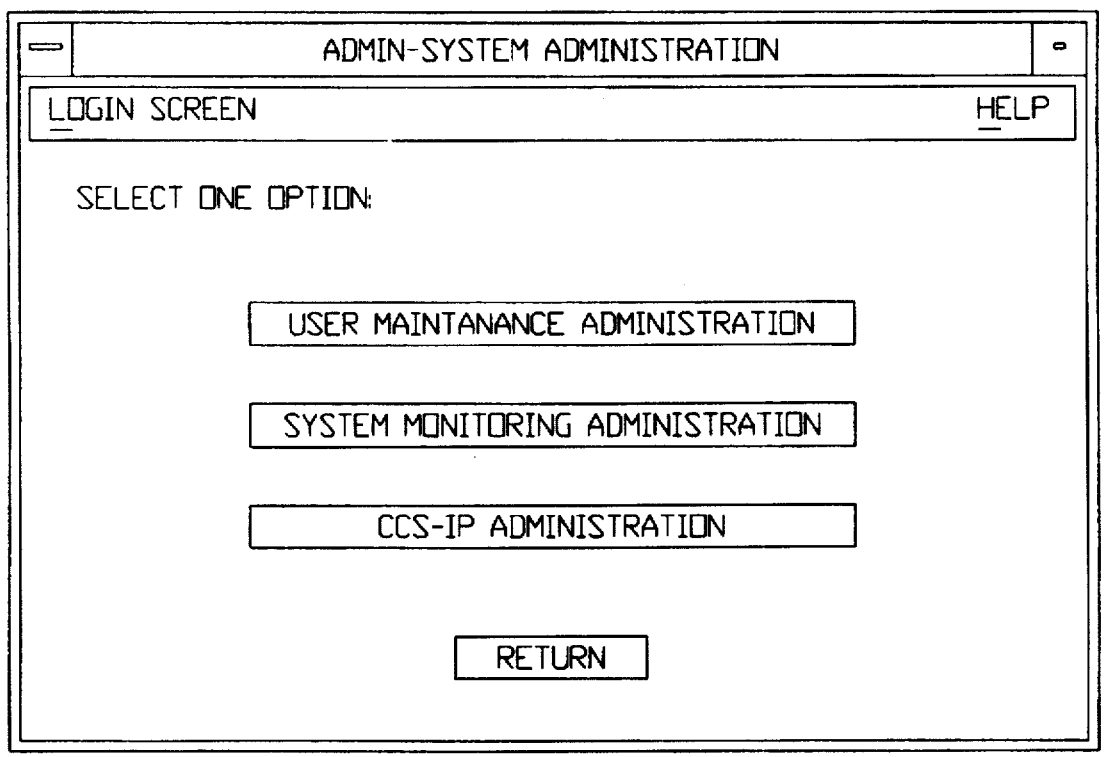
FIG. 8 illustrates a System Administration window.

The selection of the "System Administration" option at the Main Menu window illustrated in FIG. 7 allows access to the System Administration window, shown in FIG. 8, after a valid login is completed. The user can then select from three options via pushbuttons: "User Maintenance Administration", "System Monitoring Administration", or "CCS-IP Administration". Pressing a button will allow the user access to the appropriate function. The "Return" button will return the user to the Main Menu window shown in FIG. 7.

System Monitoring Administration provides the user with network management capabilities and provides the CCS-IP user interface with CCS-IP status messages and alarms. When the "CCS-IP Administration" pushbutton is pressed in the System Administration window shown in FIG. 8, the CCS-IP Administration shown in FIG. 9 is displayed.

Figure 9:
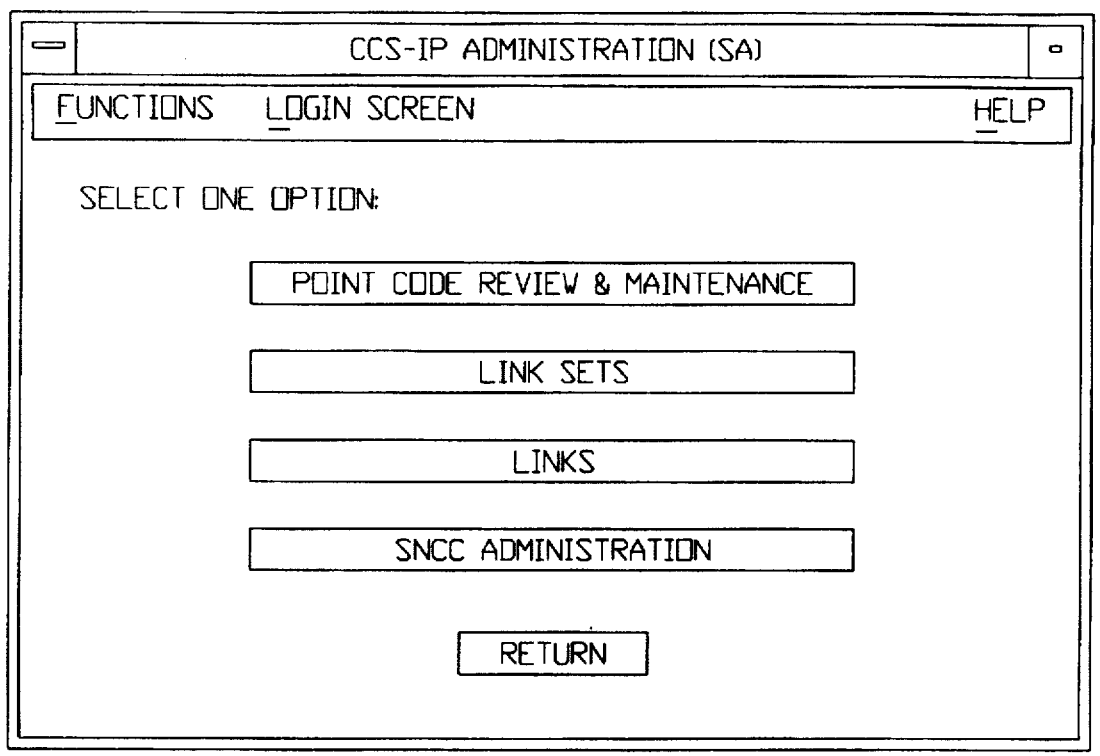
FIG. 9 illustrates a CCS-IP Administration window.
Figure 10:
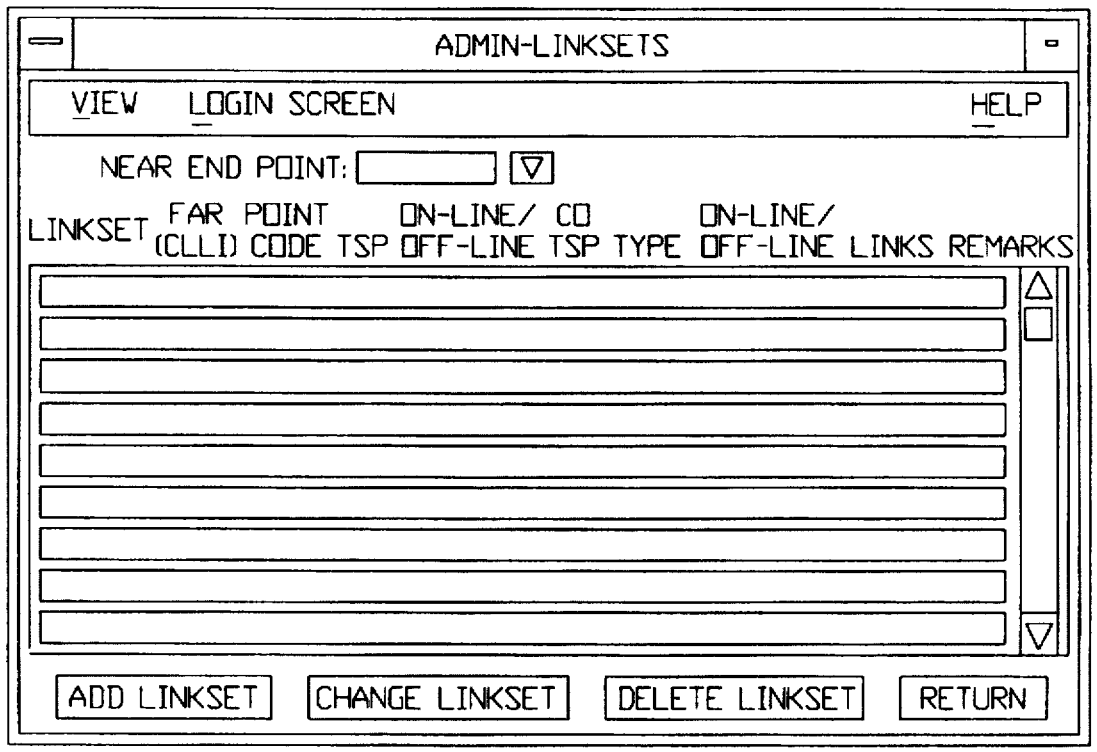
FIG. 10 illustrates a LINKSETS window.

Pressing the "Link Sets" pushbutton on the CCS-IP Administration window in FIG. 9 will display the Link Sets window shown in FIG. 10. The purpose of this window and its associated windows is to allow the user to add, change, or delete link sets that are assigned for SS7 signal monitoring.

Selection of Usage Measurement Option

Figure 11:
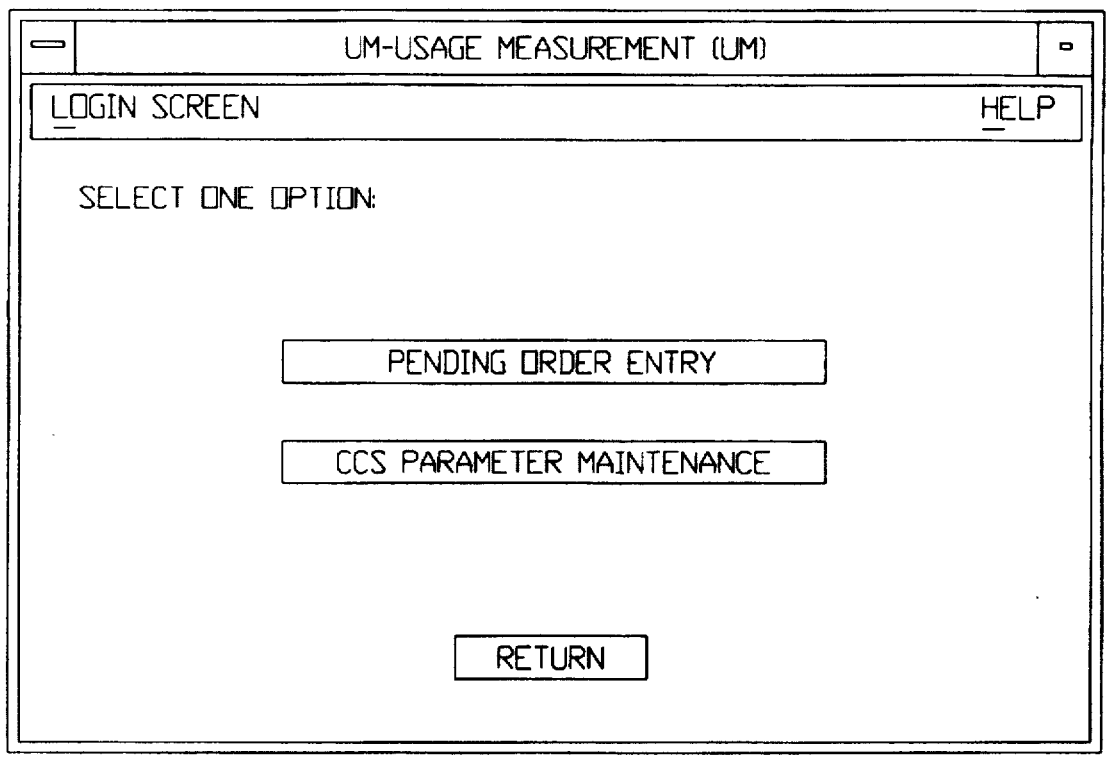
FIG. 11 illustrates a Usage Measurement window.

Selection of the "Usage Measurement" option at the Main Menu window in FIG. 7 (instead of the "System Administration" option considered above) allows access to the Usage Measurement window shown in FIG. 11. The user can select from two options via pushbuttons: "Pending Order Entry" or "CCS Parameter Maintenance."

Figure 12:
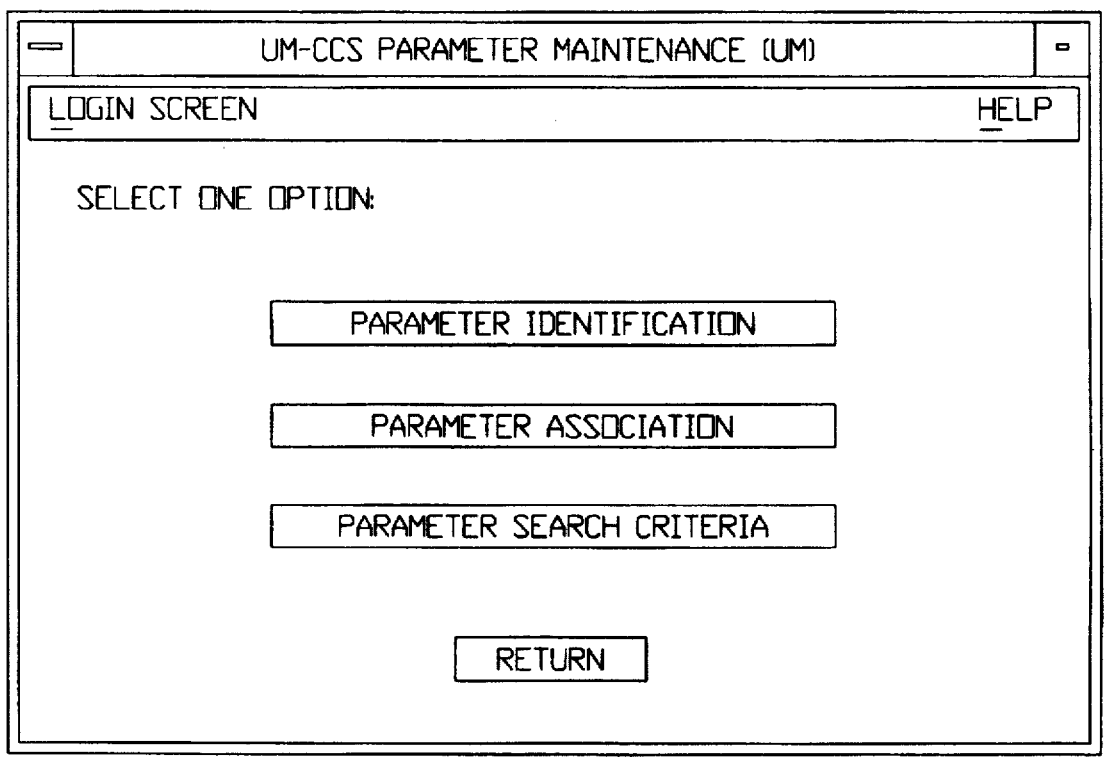
FIG. 12 illustrates a Parameter Maintenance window.

Selecting "CCS Parameter Maintenance" displays the UM-CCS Parameter Maintenance window, shown in FIG. 12, which allows the user to select from three options: "Parameter Identification", "Parameter Association", and "Parameter Search Criteria."

Figure 13:
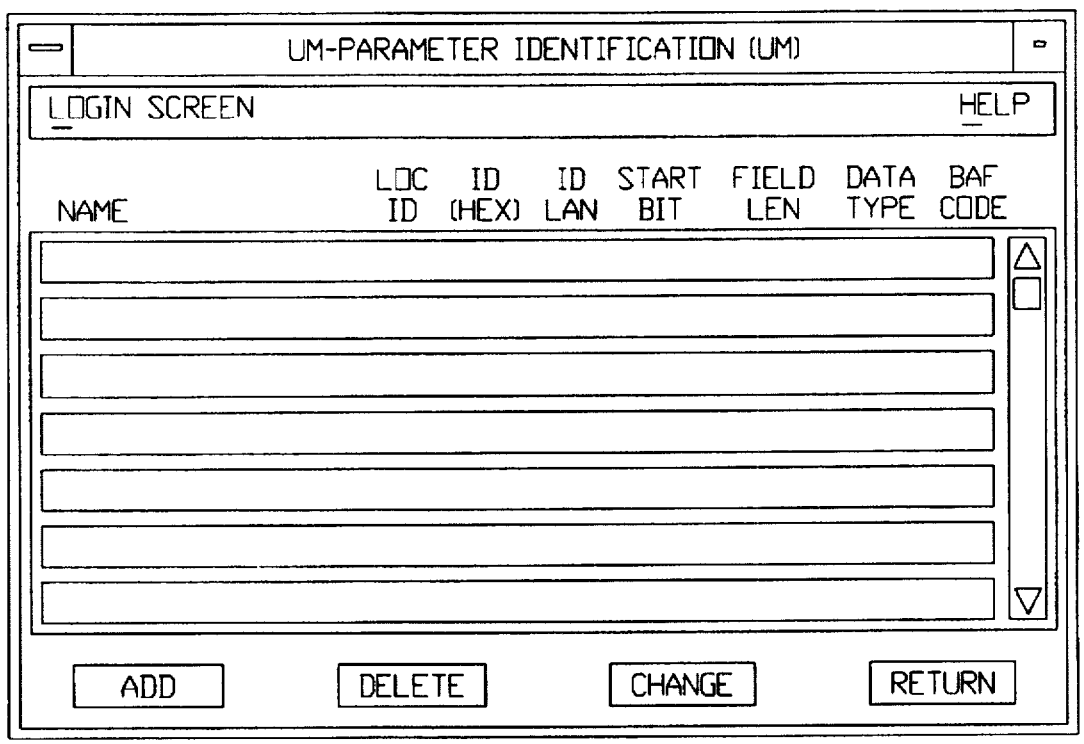
FIG. 13 illustrates a Parameter Identification window.

Assuming that "Parameter Identification" is selected, the UM-CSS Parameter Identification window shown in FIG. 13, is displayed. The parameter name, location ID, parameter ID, length of parameter ID, starting bit location, length of field, data type, and BAF code are displayed for each parameter defined in the system. The scroll bar on the right of the window is used to view additional parameters.

Three subfunctions are available on the window of FIG. 13: "Add", "Delete", and "Change" which are used for displaying other windows which will permit parameters to be added, deleted or changed.

The above examples are illustrative of the control capability provided to an operator by the GUI. Other control windows are also available, as illustrated in FIG. 6.

A particularly advantageous embodiment of the invention which illustrates additional features of the present invention will next be described with respect to FIGS. 14–28. For this purpose, the basic structure and protocol of a CCS7 network will first be revisited and further details provided.

A CCS7 network is a packet switched network that comprises nodes called Signaling Points (SP) and digital links that interconnect with the SPs. The SPs are of three basic types; namely, the Signaling Transfer Point (STP), the Service Control Point (SCP), and the Service Switching Point (SSP). The PSTN communicates with the CCS7 network via the SSPs located at the telephone company switching offices such as the end offices and tandem offices. The SSPs are connected to the STPs via digital links and an STP is coupled to an SCP via digital links. The SCPs are databases containing telephone company, subscriber and call related data. The digital links interconnecting the SPs are formed into linksets.

CCS7 separates the signaling function that sets up and supervises a call from the switched voice/data path of the call through the PSTN. Prior to CCS7, the signaling information was carried in-band on the voice/data path.

The CCS7 network conveys data packets called SS7 Signal Units (SU) generated by the SSPs and routed by the STPs. Three types of Signal Units are specified for signaling on the CCS7 network. These are denoted as Message Signal Units (MSU), Link Status Signal Units (LSSU) and Fill-In Signal Units (FISU). CCS7 network links idle by transmitting FISUs. The LSSU conveys link status information between points of the network.

The MSU carries network information and is utilized to convey call set-up and supervision signaling. The MSU also controls transaction oriented functions such as data base queries and responses to the SCPs. An MSU can be of a particular category. For example, an ISUP MSU includes an Integrated Services Digital Network User Part and is generally utilized to transfer call set-up and supervision signaling information. An SCCP MSU includes a Signaling Connection Control Part which provides routing and management functions for transfer of messages other than for call set-up. Query and response MSUs will be of the SCCP category and will include a Transaction Capabilities Application Part (TCAP). An SCCP TCAP MSU will generally be utilized in such transaction oriented functions as queries and responses to SCPs.

An MSU of a particular category can be of a variety of types. For example, an ISUP MSU can be an Initial Address Message (IAM), a Continuity Check Message (COT), an Address Complete Message (ACM), an Answer Message (ANM), or a Release Message (REL).

Other categories of MSUs are the SCCP Unitdata and the SSCP Unitdata Service which have message types of TAP query, TCAP response, TCAP conversation, and TCAP unidirectional.

The above discussed MSU categories and MSU types within the categories are merely exemplary. Numerous other MSU categories and MSU types are known in the SS7 protocol for performing a variety of functions.

Systems are known in the prior art that couple to the CCS7 network for performing specific dedicated applications. For example, an article in *TELECOMMUNICATIONS* of July 1987, volume 21 number 7, pages 67–71, entitled "SS7 Testing Tools" by B. Nelson, describes equipment for testing the CCS7 network. The equipment is manufactured by Hewlett-Packard as the Signaling Test Set HP37900D. This equipment can record information at a network point and limited analysis can be performed thereon in an ad hoc fashion.

Another dedicated system is disclosed in U.S. Pat. No. 4,788,718 issued Nov. 29, 1988, entitled "Call Data Collection and Modification Of Received Call Distribution". The disclosed system collects call data from an STP link and processes the call data to perform traffic analysis.

Another such dedicated system is disclosed in U.S. Pat. No. 5,008,929 issued Apr. 16, 1991, entitled "Billing System For Telephone Signaling Network". The system of said U.S. Pat. No. 5,008,929 captures MSUs received by an STP and processes the MSUs to identify, as a service provider, a telephone company that transports an MSU, or a telephone company that provides call data for an MSU, for example, in response to an MSU query. The MSUs are also processed to identify as a recipient for the service the telephone company that formulated the MSU.

It is appreciated that a telephone company such as an RBOC cannot readily obtain knowledge of the Signal Unit traffic flowing through its CCS network. As discussed above in connection with the referenced prior art, a dedicated system can be designed and deployed to connect to the network to analyze the Signal Unit traffic in accordance with a specifically desired "built-in" application. This approach is wasteful of interface and processing resources, particularly when plural and diverse applications are desired. Analysis of the traffic is done off-line in an ad hoc fashion by the department of the telephone company that desires the traffic data.

The particularly advantageous implementation of the invention illustrated in FIGS. 14–28, which addresses the above problems of the prior art, will next be described.

This implementation comprises a platform supporting plural application software programs related to processing SS7 Signal Units flowing through the CCS network for extracting and deriving various types of specialized information therefrom, respectively. The platform receives SS7 Signal Units copied from the CCS network and screens and filters the Signal Units into respective subsets that are of particular interest to the plural applications running on the platform. The filtered subsets of Signal Units are directed to the applications, respectively, for processing. Thus, the applications run independently with respect to each other. Generally, FISUs are discarded prior to filtering and LSSUs will be screened prior to filtering and directed to highly specialized applications that require the LSSUs. The MSUs that remain after screening out the FISUs and LSSUs are then filtered by MSU category, and by type within category, into the subsets that are appropriate for the respective applications. These filtered subsets of MSUs are then directed to the respective applications for the specialized processing for which the applications are designed. The applications can run concurrently to process the respective subsets of filtered MSUs.

In the preferred embodiment, input ports of the CCS network interface of the platform receive T1 channelized SS7 Signal Units copied from the links and linksets of the CCS network. The filtering is preferably performed on a per linkset basis where the MSUs are first grouped by linkset and then filtered for category and type. A further embodiment may perform the filtering on a per link basis.

External control of the filtering functionality is provided through a user interface whereby a user can specify desired filtering in accordance with application, linkset, Signal Unit type, MSU category and MSU type. For example, a user, such as an application owner, can access the platform for filter control from a terminal at an administration site.

Figure 14:
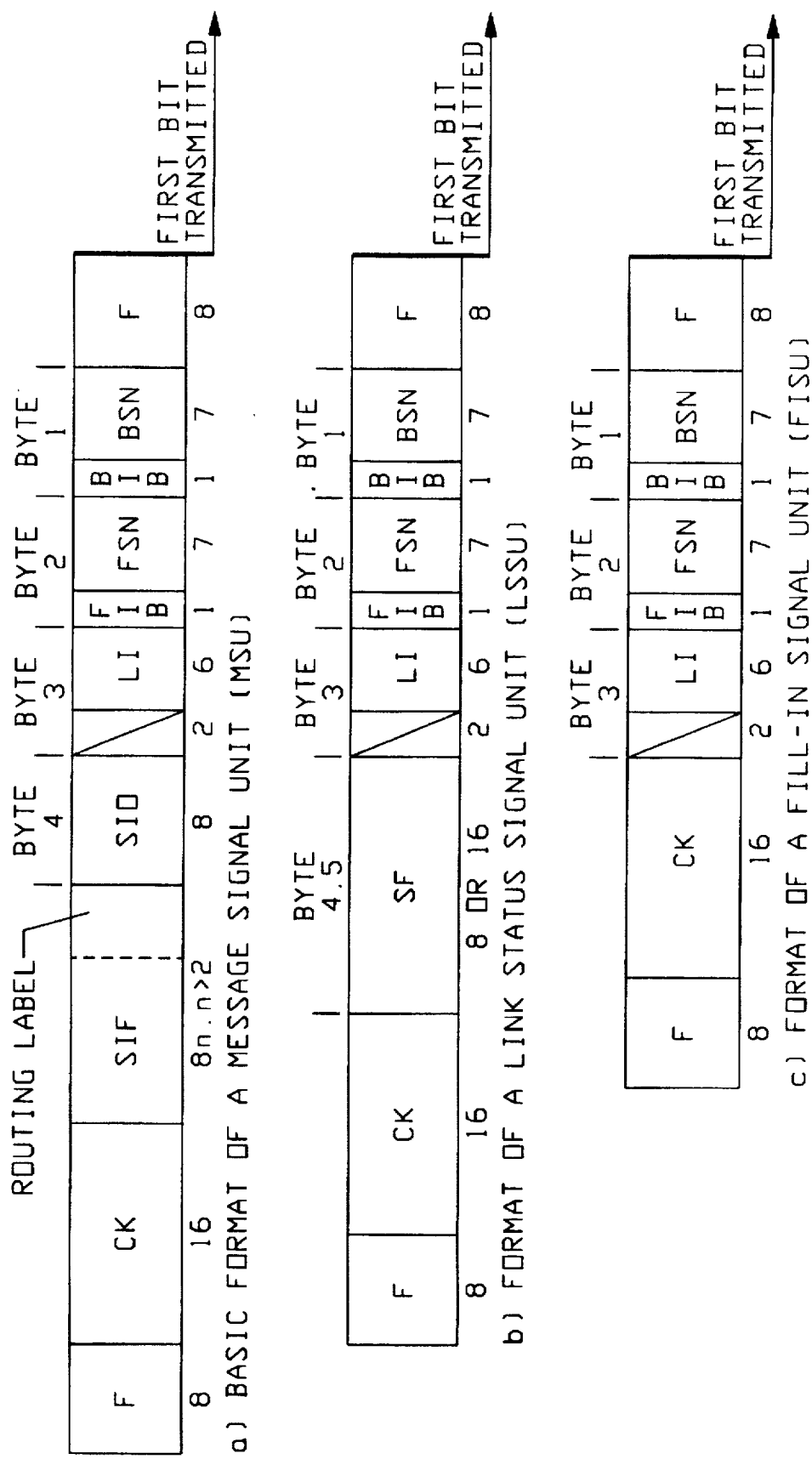
FIG. 14 is a diagram illustrating the formats of the SS7 Signal Units.
Figures 15, 17, 18:
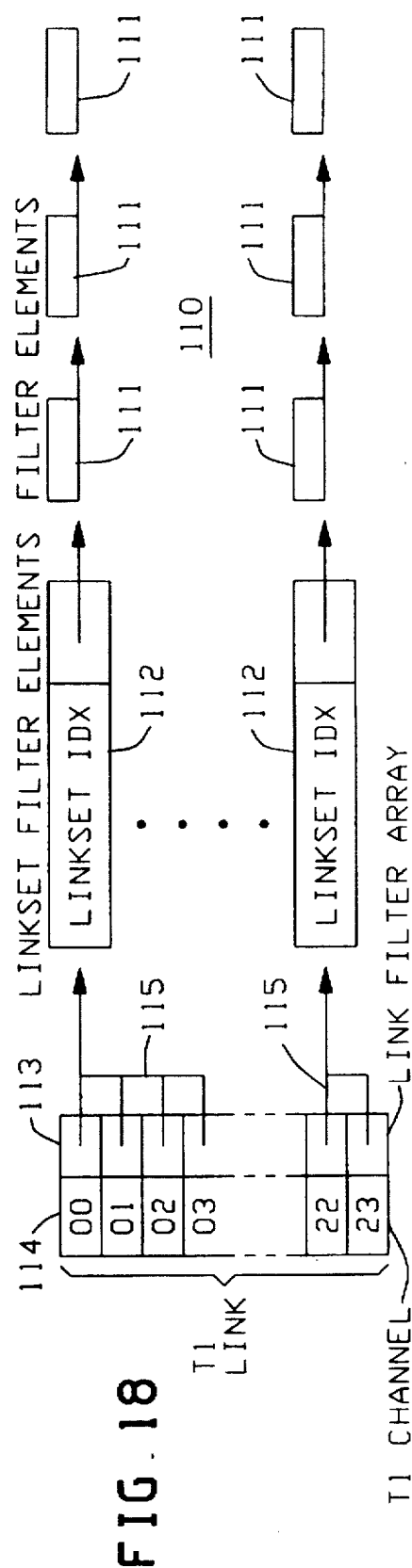
FIG. 15 is the standard routing label which is placed at the beginning of the SIF of the MSU of FIG. 14.
FIG. 17 is a diagram of the link message data structure utilized for input SU formatting in the Network Interface Platform of the CCS-IP of FIG. 16.
FIG. 18 is a diagram of the linked structure of the MSU filters of the Network Interface Platform of the CCS-Ip of FIG. 16.

Referring to FIGS. 14 and 15, FIG. 14 illustrates the formats of the MSU, the LSSU and the FISU. FIG. 15 illustrates the standard telephone label format of the SIF of the MSU. These formats are in accordance with North American (ANSI) Standards as promulgated by Bell Communications Research in Bellcore TR-NWT-000246, Issue 2, June 1991, Revision 3, December 1993. The indicated fields are as follows:

BIB=Backward indicator bit
BSN=Backward sequence number
CK=Check bits
DPC=Destination point code
F=Flag
FIB=Forward indicator bit
FSN=Forward sequence number
LI=Length Indicator
N=Number of octets in SIF
OPC=Originating point code
SF=Status field
SIF=Signaling information field
SIO=Service information octet
SLS=Signaling linkset selection The label of FIG. 15 has a length of 56 bits and is placed at the beginning of the SIF. The DPC indicates the signaling point for which the message is intended, while the OPC indicates the signaling point which is the source of the message. The SLS field is used by the signaling system to balance Signal Unit routing for load sharing.

The LI differentiates between the tree types of Signal Units as follows: the FISU has an LI of 0; the LSSU has an LI of 1 or 2; the MSU has an LI greater than 2. The SIO contains a Service Indicator (SI) which identifies the message category of the MSU (ISUP, SCCP, etc.) The SIF contains an identification of the message type within the message category. For example, an ISUP message can be of type IAM, ACM, etc. For message category ISUP, the tenth byte of the SIF identifies the message type and for message category SCCP the message type is found at byte 8 of the SIF. The TCAP and SCCP parts are contained in the SIF.

Figure 16:
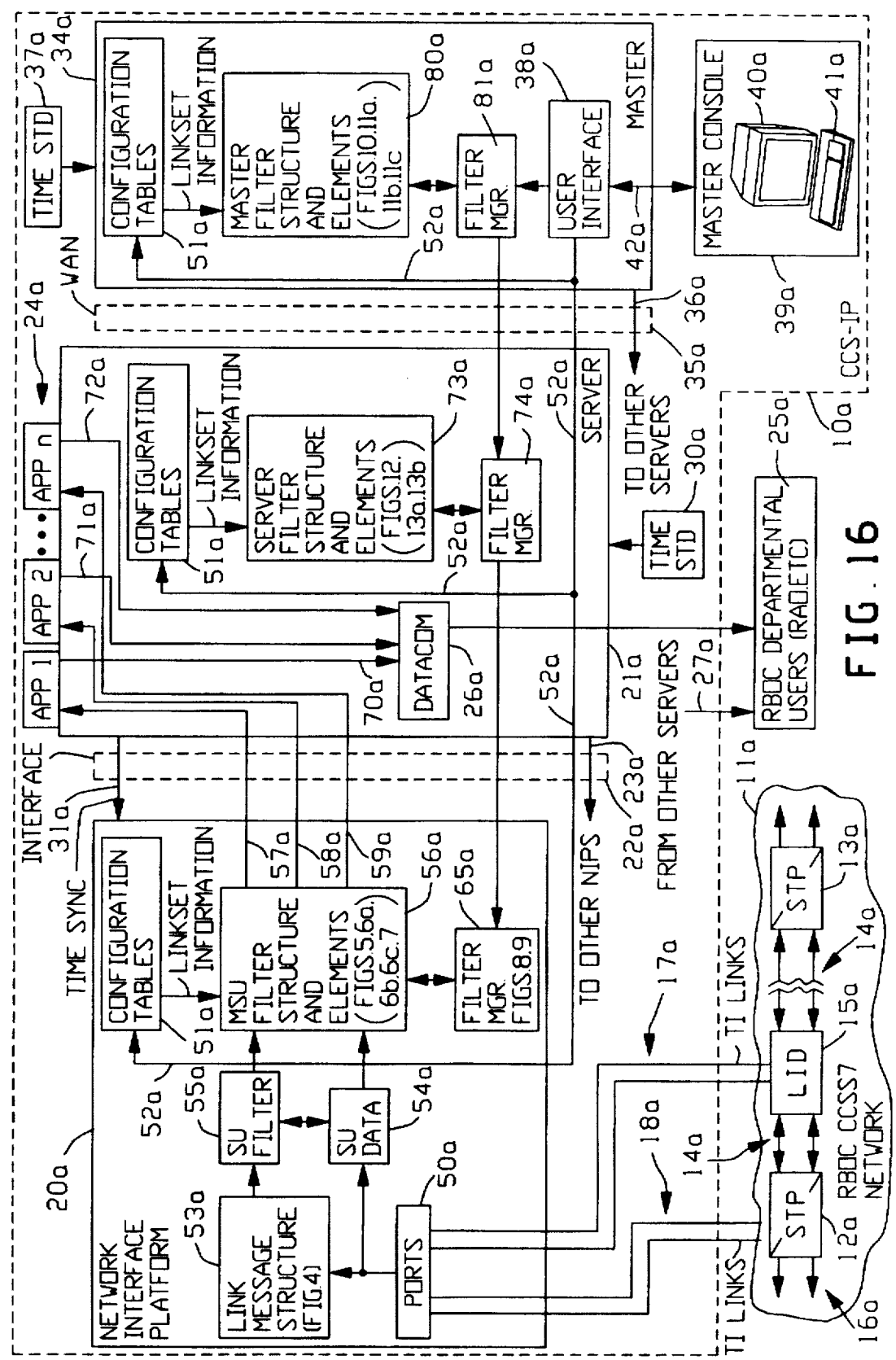
FIG. 16 is a schematic block diagram of the Common Channel Signaling - Information Platform (CCS-IP) of the present invention.

Referring to FIG. 16, a schematic block diagram of the CCS-IP 10a of the present invention is illustrated. The CCS-IP 10a is shown connected to the CCS7 network 11a of an RBOC but could be utilized with any CCS7 network. The network 11a comprises an arbitrary set of Signaling Points interconnected by digital linksets. For example, the network 11a includes STPs 12a and 13a interconnected by a digital linkset 14a. A Link Interface Device (LID) 15a is connected to the linkset 14a for copying SUs transported between STPs 12a and 13a. STP 12a is the near end point of the linkset 14a and STP 13a is the far end point. The STP 12a also terminates a linkset 16a that could terminate at another point within the network 11a or at a point outside the network. The far end terminating point of the linkset 16a could be another STP or an SSP in an End Office or Tandem Office. The SSP may or may not be owned by the RBOC that owns the network 11a. For example, the linkset 16a may terminate at an SSP in an End Office of an Alternate Exchange Carrier (AEC). Additionally, linksets terminating at the STP 12a or the STP 13a can be utilized for connections to SCPs (not shown).

The LID 15a duplicates the SUs traversing the linkset 14a and provides the duplicates thereof in channelized T1 format on T1 links 17a. Although only one linkset 14a with the associated LID 15a is illustrated, it is appreciated that groups of, or all of the linksets of the network 11a may be similarly configured with LIDs to provide copied SUs on T1 links similar to the links 17a. For example, T1 links 18a may provide SUs from these other linksets. Numerous commercial devices are available for implementing the LID 15a. For example, the DEXCS manufactured by DSC Inc. may be utilized for this purpose.

Although the LID 15a is illustrated connected adjacent to an STP, it is appreciated that the CCS-IP 10a can be connected with respect to other SPs of the network.

The CCS-IP 10a is comprised of a plurality of Network Interface Platforms (NIP), a representative one of which is identified by reference numeral 20a. The NIP 20a is a front end processing system for the CCS-IP 10a utilized to terminate T1 links, such as links 17a and 18a.

The CCS-IP 10a also includes a plurality of application data servers, a representative one of which is identified by reference number 21a. The server 21a may be implemented by any suitable high end data processing system, such as the U6000 departmental server available from Unisys Corporation of Blue Bell, Pa. The NIP 20a and the server 21a are shown intercoupled through a conventional interface 22a in a host/client relationship. The interface 22a could be implemented on any high performance bus such as Ethernet, Multibus II, VME or SCSI. Communication between the server 21a and other NIPs of the CCS-IP 10a are through such interfaces as schematically indicated at reference numeral 23a.

The server 21a supports a plurality of independent applications 24a which may run concurrently. The outputs of the applications 24a are transmitted to a departmental user 25a, such as the Revenue Accounting Office (RAO), of the RBOC. Communication with the departmental user 25a is through a conventional Data Communications (DATACOM) interface 26a, such as X.25. The departmental user 25a receives outputs from other application data servers of the CCS-IP 10a, as schematically indicated at reference numeral 27a.

The server 21a receives an input from a time standard 30a to provide synchronization of clocks. The time standard 30a is preferably implemented by a Global Positioning System (GPS) Time Machine. However, a variety of other clock synchronization methods may be used. Time synchronization is provided to the Network Interface Platform 20a through the interface 22a, as indicated by reference numeral 31a.

The network 11a is geographically dispersed through the region controlled by the RBOC that owns the network. The CCS-IP 10a includes a plurality of servers, such as the server 21a, at various sites throughout the region. Each server is coupled to one or more NIPs, such as the NIP 20a, so as to connect to the various signaling linksets of the network 11a. The SS7 SUs flowing through the network 11a are copied at the LIDs throughout the network and transported on the T1a links (such as links 17a and 18a) which terminate at the various NIPs of the CCS-IP 10a. In this manner, the CCS-IP 10a can gather information from the entire CCS7 network 11a of the RBOC. Each of the applications 24a may be distributed across several of the application data servers (such as the server 21a) for processing the information in the network SUs.

The CCS-IP 10a also includes a master station 34a that may be implemented by an suitable high end data processing system such as the U6000 departmental server available from Unisys Corporation of Blue Bell, Pa. The master station 34a communicates with the application data servers, such as server 21a, of the CCS-IP 10a via a Wide Area Network (WAN) 35a. It is appreciated that a variety of standard communication interfaces may also be utilized for this purpose. Communication with the data servers other than server 21a is schematically indicated at 36a. The master station 34a receives an input from a time standard 37a for synchronization of system clocks. The time standard 37a may also be implemented by a GPS as described with respect to time standard 30a. The master station 34a and the system data servers are arranged in a host/client relationship. The master station 34a provides a centralized, single point of control for administration of the remote client data server systems.

The master station 34a includes a user interface 38a for providing system configuration information to the CCS-IP 10a. A master console 39a, including a display 40a and a keyboard 41a, communicates with the interface 38a via a link 42a. The master console 39a is utilized to configure the CCS-IP 10a in accordance with the requirements of the network 11a. Linkset and network point identification information is entered in accordance with the network configuration. Linkset monitoring and parameter control data is entered at the master console 39a in accordance with requirements of the applications 24a and in accordance with particular specifications of the RBOC.

In a manner to be described, the master console 39a is utilized to configure MSU filtering to provide filtered and screened MSU subsets to the respective applications 24a so that an application only receives MSUs of interest.

Each of the data servers, such as the server 21a, includes a console (not shown) similar to the console 39a for providing configuration and control inputs at the RBOC remote sites at which the respective servers are located.

With continued reference to FIG. 16, the T1 link connections 17a and 18a from the network 11a terminate at ports 50a of the NIP 20a. The relationship between the T1 channels, the linkset identifiers of the network 11a and the T1 inputs of the ports 50a are provided by the RBOC and entered into the CCS-IP 10a via the master console 39a. This configuration data is stored in configuration tables 51a in the NIPs, the data servers and the master station of the CCS-IP. The information is entered via the user interface 38a on communication paths 52a. The linkset of the network 11a from which an SU is copied is uniquely identified by the T1a port and channel.

The raw T1a channelized SS7 SUs received at the ports 50a are applied to a link message structure function 53a that formats each SU into a link message structure. The link message structure will be described below with respect to FIG. 17. The SU data of the message starting with BSN is stored at an addressable location in SU data 54a. The link message structure 53a for an SU includes a pointer to the SU data stored in SU data 54a.

The NIP 20a includes an SU filter 55a for distinguishing between FISUs, LSSUs and MSUs. The SU filter 55a inspects the LI field of the SU for this purpose. The SU filter 55a accesses the SU data 54a for to obtain the LI of the SU being tested. If only MSUs are of interest, the SU filter 55a determines if the LI is at least 3. Although not shown in the figure, if the SU of interest is not an MSU message, a switch is included in the SU filter 55a for appropriately directing the LSSUs and FISUs for use by applications requiring these SU types.

The NIP 20a includes MSU filter structure and elements 56a for filtering the MSUs in accordance with linkset, application, MSU category and MSU type within a category. The MSU filter structure and elements 56a filters the MSUs into groups of interest to the applications 24a, respectively, formatting and directing the MSU groups to the respective applications via paths 57a, 58a and 59a. The configuration tables 51a provide the MSU filter structure and elements 56a with the system configuration information for correlating received MSUs with the linksets of the network 11a from which they were copied. The MSU filter structure and elements 56a accesses the SU data 54a to compare the incoming MSUs against the filters so as to provide the desired groups on paths 57a–59a. The MSU filter structure and elements 56a will be described in detail below with respect to FIGS. 18–20.

The NIP 20a includes a filter manager 65a for controlling the MSU filter function and for changing the filter structure and elements in a manner to be described. Details of the filter manager 65a will be described below with respect to FIGS. 21 and 22.

As described above, the applications 24a on the application data server 21a receive the grouped MSUs on the paths 57a–59a. The applications 24a provide respective outputs to the interface 26a via paths 70a, 71a and 72a. The server 21a includes filter structure and elements 73a which are utilized in the CCS-IP 10a in downloading and changing the filters of the NIP 20a. The filter structure and elements 73a is responsive to the configuration tables 51a of the server 21a for the reasons discussed above with respect to the configuration tables 51a of the NIP 20a. The filter structure and elements 73a will be described in detail below with respect to FIGS. 25, 26a and 26b.

The server 21a includes a filter manager 74a which is structured and functions in a manner similar to that described above with respect to the filter manager 65a.

The master station 34a includes filter structure and elements 80a utilized in downloading and changing the MSU filtering with respect to the data servers, such as the server 21a, of the CCS-IP 10a. Details of the filter structure and elements 80a will be described below with respect to FIGS. 23, 24a, 24b and 24c. The configuration tables 51a of the master station 34a provide linkset information to the filter structure and elements 80a for reasons similar to those described above with respect to the configuration tables 51a of the server 21a and the NIP 20a.

The master station 34a also includes a filter manager 81a for controlling and changing the filter structure and elements 80a. Filter changes entered at the master console 39a through the user interface 38a are entered into the filter structure and elements 80a via the filter manager 81a. These changes are downloaded to the filter structure and elements 73a of the data server 21a via the filter manager 74a and to the MSU filter structure and elements 56a of the NIP 20a via the filter manager 65a. The other servers and NIPs of the CCS-IP 10 also receive the downloaded filter information via the WAN 35a and the interfaces between the servers and the NIPs.

The embodiment of FIG. 16 was explained in terms of a CCS7 network of an RBOC. It is appreciated that the invention, as described, is generally applicable to any providers of CCS7 networks, such as Interexchange Carriers (IXC), wireless network providers and the like.

Referring to FIG. 17, with continued reference to FIG. 16, details of the link message structure 53a of the NIP 20a are illustrated. The size of the fields indicated is in bytes. The link message structure includes a message identification field 100 for administrative purposes. The structure includes a timestamp field 101 providing the time in milliseconds since midnight when the SU was received. The timestamp is derived from the time standard 30a through the time sync link 31a. A channel number field 102 contains the T1 channel number on which the SU was received. The channel number is derived from the T1 interface of the NIP 20a. The link message structure includes an SU length field 103 containing the length of the SU data. A field 104 contains a pointer to the location in SU data 54a storing the SS7 SU data starting with BSN.

Referring to FIG. 18, with continued reference to FIG. 16, the filter structure of the MSU filter structure and elements 56a of the NIP 20a is illustrated. The MSU filter structure comprises linked lists 110 of filter elements 111. The linked lists 110 originate at respective linkset filter elements 112. A link filter array 113 indexed by T1 link channel number points to the linkset elements 112. The 24 channels of a T1 link are schematically illustrated at 114. Correlation between specific T1 channels and CCS7 linksets is schematically illustrated by arrows 115.

Referring to FIGS. 19a, 19b and 19c, with continued reference to FIGS. 16 and 18, details of the elements of the MSU filter structure of FIG. 18 are illustrated. FIG. 19a illustrates a link filter array element 113. The element 113 includes a field 120 containing a pointer to the first linkset filter element 112.

FIG. 19b illustrates the linkset filter element 112. The linkset filter element 112 includes a field 121 containing the Signaling Link Set (SLS) index number of the linkset with which the element is associated. The index number is provided by the configuration tables 51a. The linkset filter element 112 also includes a field 122 containing a pointer to the first filter element 111.

FIG. 19c illustrates the details of each filter element 111. The filter element 111 includes a field 123 containing an identification of the application with which the filter element 111 is associated. The filter element 111 also includes a field 124 containing the code of the MSU category to be filtered by the element. A field of 125 of the filter element 111 contains a bit map of the MSU message types within the MSU category designated in the field 124 that are to be filtered by the filter element 111. The MSU message type field 125 is preferably implemented as a 32a byte bit map where the bits of the 32a bytes represent the respective message types within the message category of field 124. The bits corresponding to the message types to be filtered are set on. The filter element 111 also includes a field 126 containing a pointer to the next filter element 111 in the linked list 110 (FIG. 18) of filter elements.

With continued reference to FIGS. 19a, 19b and 19c, the channel field from the link message structure (FIG. 17) is utilized to index the link filter array 113. The indexed link filter array element 113 contains the pointer 120 to the linkset filter element which provides the system SLS index of the linkset being monitored. The linkset filter element 112 includes the pointer 122 to the first active filter element 111 in the linked list 110 (FIG. 18) of filter elements for the linkset designated by the linkset filter element 112.

The present invention accommodates configurations where filtering is performed by SS7 link as well as by linkset. In that arrangement, an additional pointer is added to the link filter element 113 that points to another linked list 110 of filter elements 111 only for that link. The filtering process then checks all filters for the link, then all filters for the link's linkset.

As discussed above, the MSU filtering for MSU category and type within category is done in the MSU filter structure and elements 56a of the NIP 20a of FIG. 16. The link message structure of FIG. 17 is applied to the MSU filter structure and elements 56a which obtains the data for the associated MSU from the location of SU data 54a pointed to by field 104 of the link message structure. Each MSU is compared to each filter element 111 of the linked list 110 pointed to by the linkset filter element 112. The message category code in field 124 of the filter element 111 is compared to the message category in the SI field of the MSU. If a match occurs, the message type in the SIF field of the MSU is compared to the message type bit map of the filter element 111 to determine if the message type is on. If an MSU passes the tests of a filter element 111, the message is formatted and sent to the application designated in field 123 in a manner to be described. Thus, each incoming MSU from a CCS7 linkset is tested against each filter element 111 of the linked list 110 pointed to by the linkset filter element 112 for that linkset.

Figures 20, 21:
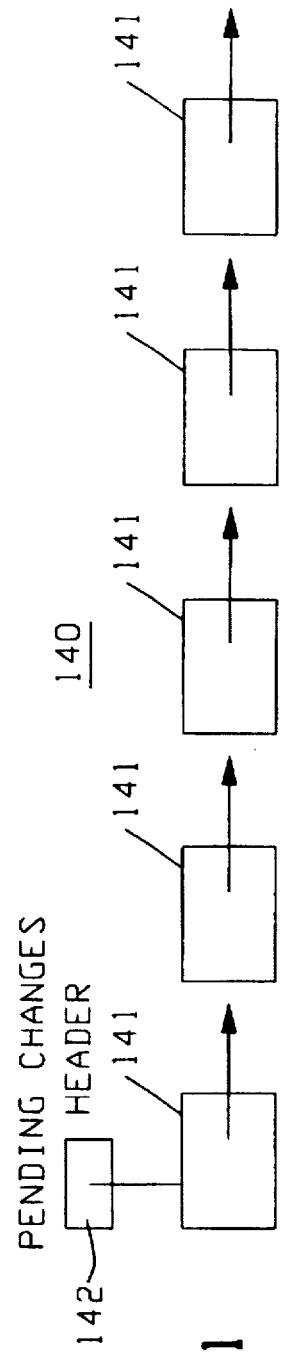
FIG. 20 is a diagram of the format of the data structure of the application message passed by the MSU filters of FIG. 18 to the applications running on the CCS-IP.
FIG. 21 is a diagram of the linked filter change structure utilized by the filter manager of the Network Interface Platform of the CCS-IP of FIG. 16.

When an MSU passes the tests of a filter element 111 it is formatted and transmitted to the application identified by field 123 of the filter element. Referring to FIG. 20, the application message format is illustrated. The application message includes a field 130 for containing an identifying header. A field 131 is utilized for the message category and is derived from field 124 of the filter element 111. A field 132 is utilized to denote the message type which is obtained by copying the message type from the appropriate byte of the message SIF field. A field 133 is utilized to contain the number of octets in the message data field. This includes the SIO and SIF fields from the MSU. The value is determined by counting the octets between successive flag fields on the signaling link.

A field 134 is utilized to contain the signaling linkset index and, as described above, is sent to the filtering function from the configuration tables 51a along with the MSU. The value is retrieved from the linkset filter element 112. A field 135 designates the direction, send or receive, of the MSU. As described above, the CCS-IP 10a is configured so that sending SS7 links are given odd numbered T1 channels, whereas receiving SS7 links are given even numbered T1 channels. The channel number is contained in field 102 of the link message structure of FIG. 17. A field 136 contains the timestamp of the message which is derived from field 101 of the link message structure of FIG. 17. A field 137 is utilized to contain the data field of the MSU which is comprised of SIO and SIF. The data field is derived from SU data 54a in accordance with the pointer of field 104 of the link message structure of FIG. 17.

The formatted application message of FIG. 20 is sent to the appropriate application utilizing the application identification of field 123 of filter element 111 (FIG. 19c) as the address of the application.

As described above with respect to FIG. 16, changes to the filters are effected at the master station 34a and downloaded through the appropriate server 21a to the appropriate NIP 20a. The filter manager 65a of the NIP 20a effects the filter changes to the MSU filter structure and elements 56a. Details of the filter manager 65a are illustrated in FIGS. 21 and 22.

Referring to FIG. 21, the filter change structure is illustrated. The structure comprises a linked list 140 of filter change elements 141 with an identifying header 142.

Referring to FIG. 22, details of the filter change element 141 are illustrated. A field 150 identifies the linkset, by linkset index number, of the filter in which the change is desired. A field 151 identifies the application for which the filter to be changed is utilized. Fields 152 and 153 designated the MSU category and MSU type, respectively, of the filter to be changed and a field 154 contains the time at which the change should become effective. A status field 155 indicates whether the change element is pending or active and an action field 156 designates the pending status of "no action pending", "to be added", "to be changed", or "to be deleted". A field 157 provides a pointer to the next filter change element 141 in the linked list 140.

The filter manager 65a receives filter changes from the filter manager 74a of the server 21a and stores the filter changes in the pending changes linked list of FIG. 21. The filter manager 65a periodically checks each pending filter change element 141 to determine if the effective time has expired, and if so, makes the changes in the change element 141 effective. Filter elements 111 are added or deleted from the linked lists 110 or changed in accordance with the actions and data specified in the change elements 141. When the change element 141 designates the "to be added" action, the new filter element 111 is added to the end of the list 110. When the action designated in a change element 141 is completed, the change element is deleted from the linked list 140. The filter manager 65a considers the change elements 141 for potential activation in the order in which they appear in the linked list 140.

With continued reference to FIG. 16, the MSU filter structure and elements 56a are constructed, managed and modified by the filter manager 65a based on information downloaded from the master station filter manager 81a through the server filter manager 74a. To implement this functionality, the master station 34a includes the filter structure and elements 80a controlled by the filter manager 81a, and the server 21a includes the filter structure and elements 73a controlled by the filter manager 74a. The filter structure and elements 73a and 80a are similar in configuration and content to those discussed above with respect to FIGS. 18, 19a, 19b and 19c. In addition, the server filter manager 74a includes filter change structure and elements similar to those discussed above with respect to FIGS. 21 and 22. Filter modifications are entered by users (e.g. application owners) via the master console 39a and the user interface 38a in a manner to be described.

Figure 23:
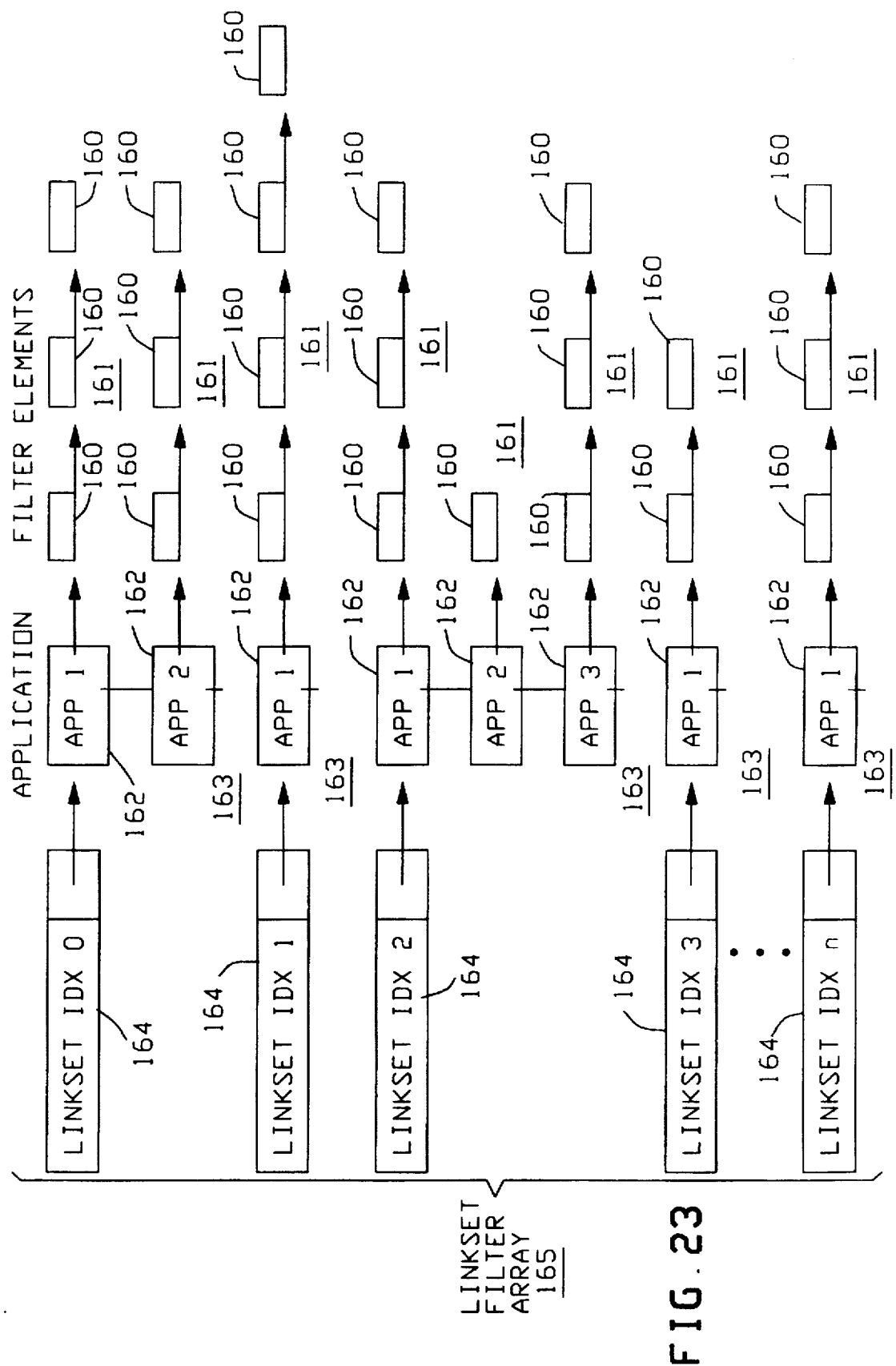
FIG. 23 is a diagram of the linked filter structure of the master filter structure and elements of the master station of the CCS-IP of FIG. 16.

Referring to FIG. 23, the master filter structure of the master filter structure and elements 80a is illustrated. The master filter structure is comprised of a plurality of filter elements 160 formed into linked lists 161 each of which originates at an application element 162 of an application linked list 163. Each application linked list 163 originates at a linkset filter element 164 in a signaling linkset array 165 that represents all signaling linkset in the system. The linkset filter array element 164 is indexed by linkset index number. Each element in the array 165 contains a pointer to the first application that has filters for the linkset.

Referring to FIG. 24a, the master linkset element 164 is illustrated. The linkset filter array 165 contains one master linkset element record 164 for each linkset of the system. The element 164 includes a field 170 containing a pointer to the application element 162 of the first application element in the linked application list 163.

Referring to FIG. 24b, details of the application element 162 are illustrated. The element 162 includes a field 171 containing the application ID and a field 172 contains the application status of on/off. The application status of field 172 indicates whether or not the application is active on the linkset. Filtering is not performed for applications that have been turned off. A field 173 contains an action indicator specifying whether the application is to be turned on or off at the effective time or if no action is pending for the application. A field 174 contains the effective time for turning the application on or off. A field 175 contains a pointer to the first filter element 160 in the associated filter element linked list 161. A field 176 contains a pointer to the next application element 162 in the application element linked list 163.

Referring to FIG. 24c, details of the master filter element 160 are illustrated. A field 180 contains the message category code of MSUs to be filtered. A field 181 contains a bit map of message types for designating MSU types within the MSU category of field 180. As discussed above with respect to the field 125 of FIG. 19c, the respective bits of the bit map denote the MSU types. A field 182 contains the effective time that an action pending against the filter element will be activated. A field 183 contains a status indicator designating whether an action is pending for the filter element or if it has been activated. A field 184 contains an action indicator denoting the type of action to be effective. A field 185 contains a pointer to the next filter element 160 in the linked list 161.

Figure 25:
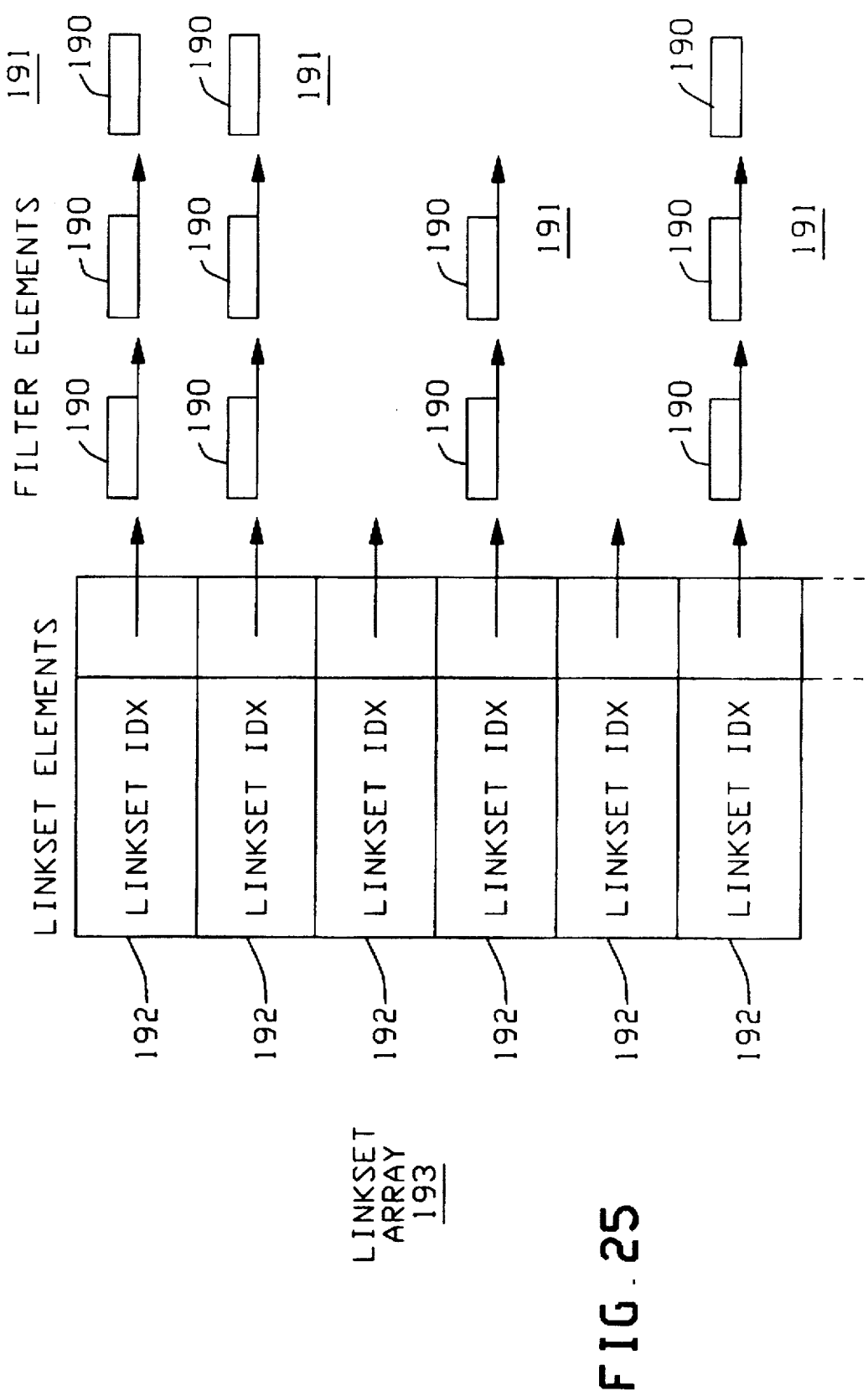
FIG. 25 is a diagram of the linked filter structure application data server of the CCS-IP of FIG. 16.

Referring to FIG. 25, the server filter structure of the server filter structure and elements 73a of the server 21a is illustrated. Filter elements 190 form linked lists 191 each of which originates at an element 192 in a signaling linkset array 193. The signaling linkset array 193 contains an element 192 for each linkset-near end point combination in the system. Each of the servers, such as server 21a, of the CCS-IP 10a, will only have filters for the linksets under its control.

Referring to FIGS. 26a and 26b, details of the elements 190 and 192 of FIG. 25 are illustrated. FIG. 26a illustrates the linkset filter array element 192 having a field 200 containing a pointer to the first filter element 190 for the linkset. The linkset array 193 has one linkset element 192 per linkset.

FIG. 26b illustrates the server filter element 190 which contains fields 201-204. The fields 201-204 are the same as fields 123-126 of FIG. 19c and are described above with respect thereto. The filter manager 74a of the server 21a also includes a filter change structure and elements constructed in the manner described above with respect to FIGS. 21 and 22.

Referring again to FIG. 16, the user interface 38a provides a menu driven procedure to a user at the master console 39a for entering filter and filter change information. A sequence of windows are displayed through which the user can navigate to enter the data. A main menu window (FIG. 7) lists the applications on the CCS-IP 10a for user selection. When a user selects an application, a window (not shown) lists the linksets of the network 11a for which the selected application is configured and an edit option is provided in the window. When the user selects a linkset and the edit option, a further window provides the user with the option to edit the filters on that linkset for the selected application. This window is illustrated in FIG. 27.

Figure 27:
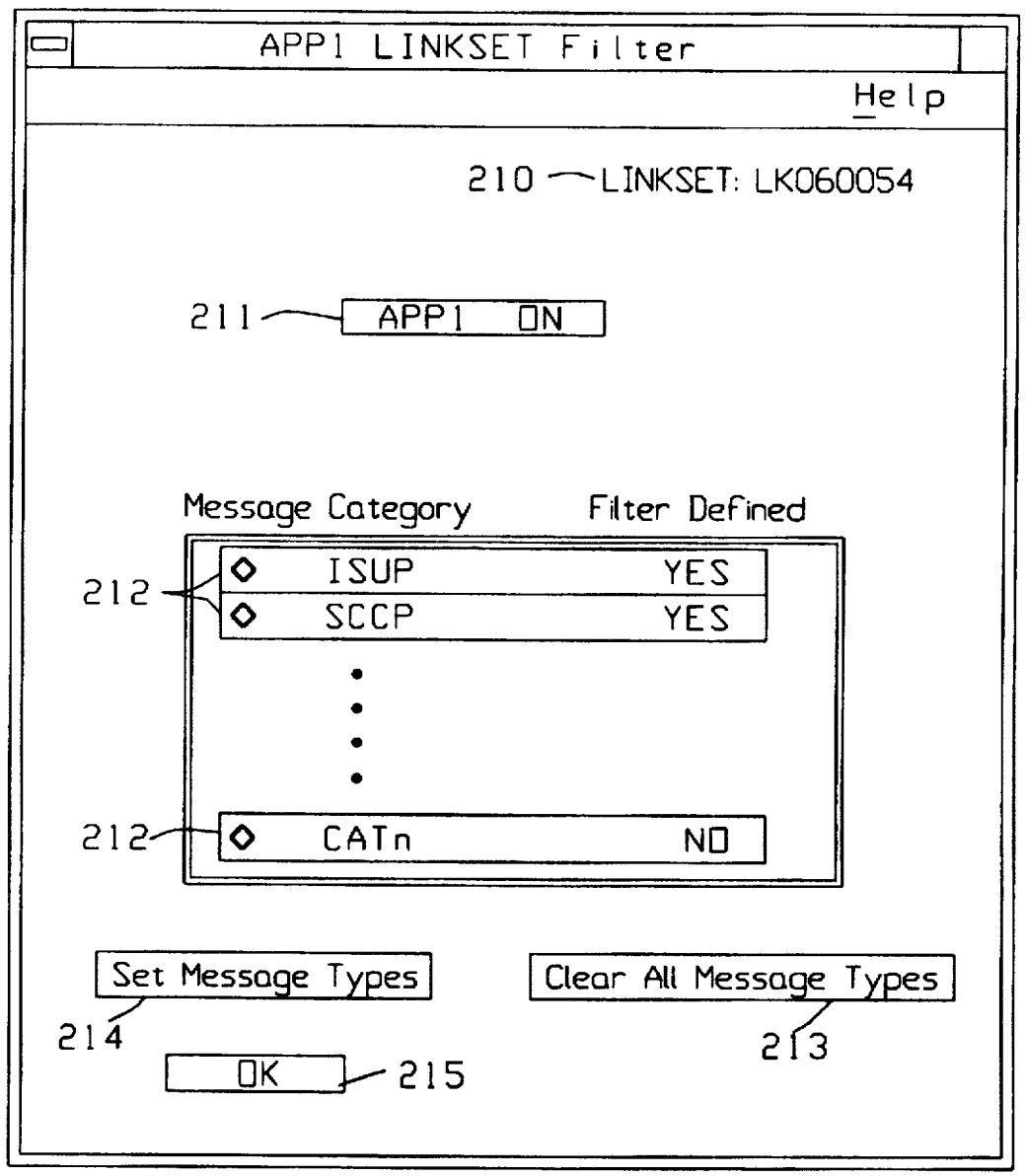
FIG. 27 is an illustration of a user interface window displayed on the master console of FIG. 16 for configuring the filter MSU category pursuant to an application and linkset.

Referring to FIG. 27, the top of the window displays the current application and the window title which, in this case, is Linkset Filter and a field 210 displays the identification of the selected linkset. A toggleable pushbutton 211 shows whether the selected application is on or off. The status of the application can be changed by toggling the pushbutton 211. Each message category is displayed and whether or not a filter has been defined for that category. Pushbuttons 212 permit the user to select a filter to add, change, or delete. To delete a filter, a pushbutton 213 is utilized. To add or change a filter, a pushbutton 214 is utilized. A pushbutton 215 is provided to enter desired values. Selecting the pushbutton 214 brings up the Linkset Filter Message Types window illustrated in FIG. 28.

Figure 28:
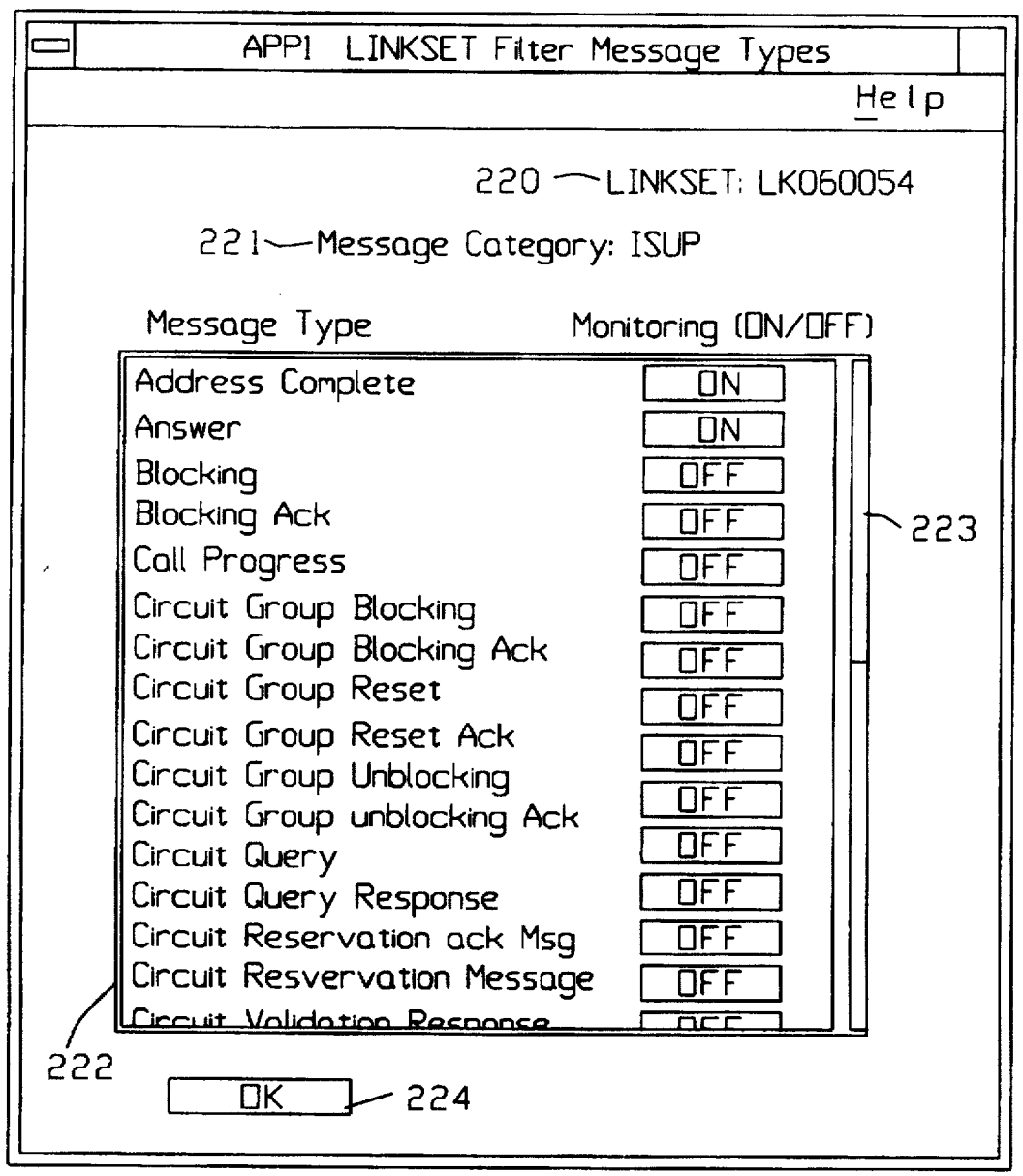
FIG. 28 is an illustration of a user interface window displayed on the master console of FIG. 16 for configuring the filter MSU type pursuant to MSU category, application and linkset.

Referring to FIG. 28, the top of the window displays the current application and the window title which, in this case, is Linkset Filter Message Types. The selected linkset is displayed in a field 220 and the selected message category is displayed in a field 221. A window 222 displays all of the message types associated with the selected message category and the on/off status each message type for the selected linkset. The "Monitoring (ON/OFF)" toggle field permits the user to select ON or OFF for each message type. A scroll bar 223 permits scrolling through the message types. A pushbutton 224 is utilized to record the filter.

With continued reference to FIG. 16, when changes are to be made to filters through the user interface 38a, the user interface 38a sends a message to the filter manger 81a. The filter manager 81a receives the filter changes, sends the changes by updating the master filter structure and elements 80a. On server 21a, the filter manager 74a receives the filter changes from the master station 34a, sends the changes to the filter manager 65a and stores the changes by updating the server filter structure and elements 73a. The filter manager 65a of the NIP 20a updates the MSU filter structure and elements 56a at the appropriate effective times.

From the windows on the master console 39a, the user has the option to add, delete, and change message category or modify message types. The user of an application may also turn monitoring on or off for a selected linkset. These functions are effected from the windows illustrated in FIGS. 27 and 28. For example, pushbutton 211 turns monitoring on and off for the selected linkset and application. The filter manager 81a appropriately sets fields 172 and 173 of FIG. 24b.

Monitoring is turned on and off for a selected linkset and application without losing filters that have been created. When monitoring is turned off for a linkset and application, the appropriate filters are deleted from the structure of FIG. 18. When monitoring is turned back on, the appropriate filters are downloaded from the master station 34a and re-entered into the filter structure of FIG. 18.

It is appreciated from the foregoing, that the CCS-IP 10a of the implementation shown in FIGS. 14–28 provides the capability to filter selected SU types and MSU categories and types so as to filter and forward messages to a plurality of concurrently deployed SS7 applications. SS7 messages are provided to whatever applications need to receive them, permitting the applications to decrease the volume of messages they receive by filtering out unwanted message categories and types. Preferably, filtering is by linkset or link and can be by any MSU category and any MSU type based on category. Upon receipt of a message which fulfills all filtering criteria for an application, the complete SU is provided to the application together with the timestamp, signaling linkset identification and send/receive indication (see FIG. 20).

It is appreciated from the above descriptions of the filter structure and elements, that a framework is provided to facilitate adding applications to the application set 24a. The described mechanisms for adding SU and MSU filtering for new applications facilitates adding applications to the platform.

Typical application software programs that my be deployed on the CCS-IP 10a (applications 24a, FIG. 16) are as follows.

A Usage Measurement (UM) application may be deployed by an RBOC to determine the MSU traffic sent and received on the peripheral links of its CCS7 network 11a. These peripheral links may be rented by, for example, other telephone companies. Aggregate counts of MSUs meeting predetermined criteria may be provided in such an UM application. For this UM application, the SU filter 55a would pass only MSUs and the MSU filters 56a would only monitor the peripheral links and would pass only ISUP messages of pre-selected types and SCCP Unitdata or Unitdata Service messages with a TCAP portion.

Another application may involve End Office Integration (EOI) where the RBOC is interested in conversation time or access time for calls originating from an Alternate Exchange Carrier (AEC) end office that complete through a tandem office of the RBOC either to an Interexchange Carrier (IXC) or to another end office in the LATA. For such an application, the SU filter 55a would pass only the MSUs. The MSU filters 56a for the EOI application would only monitor linksets originating from an AEC and would pass ISUP messages of the IAM, ACM, ANM, and REL types.

An ROBC may desire to deploy a Network Surveillance and Monitoring (NSM) application which would require that all linksets of the RBOC CCS7 network 11a be monitored. The filters 55a and 56a would pass all SUs to this application.

A Fraud Detection and Prevention (FDP) application may involve the ISUP MSUs of selected types (IAM, ANM, REL) as well as SCCP MSUs of TCAP query and response types.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. A user-controllable data processing system for processing common channel signals derived from a telephone network comprising:

a master data processing station and at least one data processing site communicating therewith;

said data processing site including means for receiving said common channel signals;

said master station including means for downloading application software from said master station to said data processing site for running one or more applications with respect to said common channel signals;

said data processing site being responsive to said downloaded software from said master station for selectively extracting and processing data derived from said common channel signals as required by said applications;

said master station including a user-controllable graphical interface for controlling the selective extracting and processing provided by said data processing site in response to said downloaded software for each downloaded application, said system defining a platform for use with a Common Channel Signaling System No. 7 (CCS7) network which transports SS7 Signal Units (SU) therethrough, said platform supporting a plurality of said applications for processing SUs in accordance with diverse application functionality, respectively, said platform including, input interface means for receiving copies of said SUs from said CCS7 network, and filtering means for separating said SUs into groups of SUs of interest to said plurality of applications, respectively, said platform operative to direct said groups of SUs to said applications, respectively.

2. A data processing system for processing common channel signals derived from a common channel signaling network comprising:

a master data processing station and at least one data processing site communicating therewith;

said data processing site including means for receiving said common channel signals and for selectively extracting and processing data derived therefrom;

said master station and said data processing site each including a mated pair of data processors and associated non-volatile common storage, one data processor of each mated pair operating as a primary data processor and the other one operating as a standby data processor;

each primary data processor operating during data processing to store processed data in the associated non-volatile common storage along with recovery data;

each pair of mated data processors operating such that failure of a primary data processor results in the standby processor of the mated pair accessing the data stored in the associated non-volatile common storage for recovering from the failure of the primary data processor and for continuing processing, said system defining a platform for use with a Common Channel Signaling System No. 7 (CCS7) network which transports SS7 Signal Units (SU) therethrough, said platform supporting a plurality of concurrently executable application software programs for processing SUs in accordance with diverse application functionality, respectively, said platform including, input interface means for receiving copies of said SUs from said CCS7 network, and filtering means for separating said SUs into groups of SUs of interest to said plurality of application software programs, respectively, said platform operative to direct said groups of SUs to said application software programs, respectively.

3. A platform for use with a Common Channel Signaling System No. 7 (CCS7) network which transports SS7 Signal Units (SU) therethrough, said network including means for copying said SUs to provide copied SUs, said platform comprising:

input interface means for receiving said copied SUs from said copying means, a plurality of concurrently executable application software programs supported on said platform for processing said copied SUs in accordance with diverse application functionality, respectively, and, filtering means for separating said copied SUs into a plurality of groups of SUs appropriate to said diverse application functionality of said plurality of application software programs, respectively, said filtering means including identification of said application software programs (application IDs) and SU criteria identifying SUs appropriate to said diverse application functionality of said application software programs, respectively, said filtering means being operative for comparing said copied SUs to said SU criteria for each said application software program so as to provide said plurality of groups of SUs in accordance with said application IDs, respectively, said platform operative to direct said plurality of groups of SUs to said plurality of application software programs in accordance with said application IDs, respectively, for processing said plurality of groups of SUs by said plurality of application software programs in accordance with said diverse application functionality, respectively.

4. The platform of claim 3 wherein an SU can be of an SU type including a Fill-In Signal Unit (FISU) type, a Link Status Signal Unit (LSSU) type or a Message Signal Unit (MSU) type, said filtering means comprising:

SU filter means responsive to said copied SUs for selectively passing or discarding said copied SUs in accordance with said SU type.

5. The platform of claim 3 wherein an SU can be of an SU type including a Fill-In Signal Unit (FISU) type, a Link Status Signal Unit (LSSU) type or a Message Signal Unit (MSU) type, said filtering means comprising:

SU filter means responsive to said copied SUs for passing said MSUs.

6. The platform of claim 5 wherein an MSU can be of an MSU category that is one of a plurality of MSU categories, said filtering means comprising:

MSU filter means responsive to said MSUs passed by said SU filter means for separating said MSUs into said groups in accordance with said MSU category.

7. The platform of claim 6 wherein an MSU of an MSU category can be of an MSU type within said MSU category, said MSU filter means being further operative to separate said MSUs into said groups in accordance with said MSU type.

8. The platform of claim 7 wherein said CCS7 network includes signaling linksets for transporting said SUs, said MSU filter means comprising:

a plurality of linked lists of filter elements, each linked list being associated with one of said linksets, each said filter element including a field for identifying one of said application software programs, a field for identifying said MSU category and a field for identifying said MSU type, said MSU filter means being operative for comparing said MSUs passed by said SU filter means with said filter elements so as to separate said MSUs into said groups.

9. The platform of claim 8 wherein said field identifying said MSU type comprises a bit map of MSU types where each bit of said bit map represents a separate MSU type.

10. The platform of claim 9 wherein said MSU filter means is operative to separate an MSU into a group based on said field identifying one of said application software programs.

11. The platform of claim 7 further including:

user interface means for entering filter change data into said platform, and filter change means for entering said filter change data into said filter elements.

12. The platform of claim 11 wherein said filter change data relates to said application software programs, said MSU categories and said NSU types, said filter change means being operative to enter said filter change data into said fields of said filter elements in accordance with said application software programs, said MSU categories and said MSU types.

13. The platform of claim 11 wherein said filter change data includes linkset related data, said filter change means being operative to modify said MSU filter means in accordance with said linkset related data.

* * * * *